(12) United States Patent
Takahashi et al.

(10) Patent No.: US 12,295,802 B2
(45) Date of Patent: May 13, 2025

(54) CERAMIC MILL BLANK FOR DENTAL CUTTING AND MACHINING

(71) Applicant: SHOFU INC., Kyoto (JP)

(72) Inventors: Shuhei Takahashi, Kyoto (JP); Satoshi Fujiwara, Kyoto (JP); Munehira Takenaka, Kyoto (JP)

(73) Assignee: SHOFU INC., Kyoto (JP)

( * ) Notice: Subject to any disclaimer, the term of this patent is extended or adjusted under 35 U.S.C. 154(b) by 0 days.

(21) Appl. No.: 18/234,611

(22) Filed: Aug. 16, 2023

(65) Prior Publication Data

US 2024/0252292 A1    Aug. 1, 2024

(30) Foreign Application Priority Data

Aug. 17, 2022  (JP) ................................. 2022-130276
May 12, 2023  (JP) ................................. 2023-079733

(51) Int. Cl.
| | | |
|---|---|---|
| B32B 7/12 | (2006.01) | |
| A61C 13/00 | (2006.01) | |
| B32B 3/30 | (2006.01) | |

(52) U.S. Cl.
CPC ...... *A61C 13/0022* (2013.01); *A61C 2201/00* (2013.01); *B32B 3/30* (2013.01); *B32B 7/12* (2013.01)

(58) Field of Classification Search
CPC .................................................. A61C 13/0022
See application file for complete search history.

(56) References Cited

U.S. PATENT DOCUMENTS

2007/0275352 A1    11/2007  Gubler et al.
2018/0055612 A1*    3/2018  Kadobayashi ..... A61C 13/0004
(Continued)

FOREIGN PATENT DOCUMENTS

| | | |
|---|---|---|
| EP | 3 372 192 | 9/2018 |
| JP | 5698096 | 2/2015 |

(Continued)

OTHER PUBLICATIONS

Office Action issued Oct. 31, 2022 in Japanese Patent Application No. 2022-130299, with English-language translation.

(Continued)

*Primary Examiner* — Elizabeth E Mulvaney
(74) *Attorney, Agent, or Firm* — Wenderoth, Lind & Ponack, L.L.P.

(57) ABSTRACT

To provide a ceramic mill blank for dental cutting and machining in which cracks or chips are not caused on the outer edge of the ceramic mill blank even if attaching to and detaching from a dental milling machine are repeated and it is possible to machine the vicinity of the outer edge of the ceramic mill blank.

To provide a ceramic mill blank for dental cutting and machining, wherein, the ceramic mill blank for dental cutting and machining comprises a ceramic portion to be cut and machined and one or more seal members, the ceramic portion consists of a ceramic material which is not finally sintered, the ceramic portion has an outer peripheral surface which is engageable with a holding tool, the one or more seal members are provided on the outer peripheral surface of the ceramic portion, and a length of the one or more seal members is 50% or more of a length in a circumferential direction of the outer peripheral surface provided with the one or more seal members.

19 Claims, 36 Drawing Sheets

(56) References Cited

U.S. PATENT DOCUMENTS

| | | | |
|---|---|---|---|
| 2018/0243055 A1* | 8/2018 | Ito | A61C 5/77 |
| 2021/0161628 A1* | 6/2021 | Crittenden | A61C 13/0022 |
| 2022/0142755 A1* | 5/2022 | Lichtensteiger | A61C 13/34 |

FOREIGN PATENT DOCUMENTS

| | | |
|---|---|---|
| JP | 2018-50897 | 4/2018 |
| JP | 2019-72228 | 5/2019 |
| JP | 6785753 | 10/2020 |
| JP | 2020-199281 | 12/2020 |

OTHER PUBLICATIONS

Extended European Search Report issued Jan. 22, 2024 in European Patent Application No. 23191693.3.

* cited by examiner

[Fig.1]
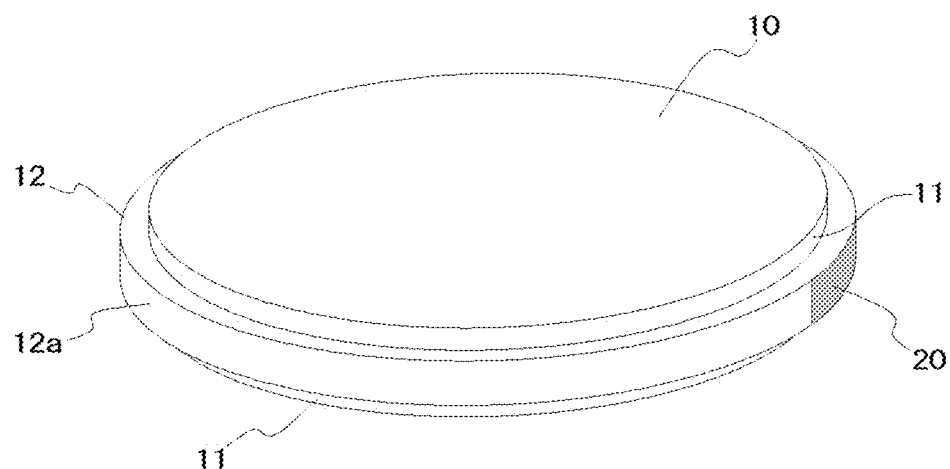
[Fig.2]
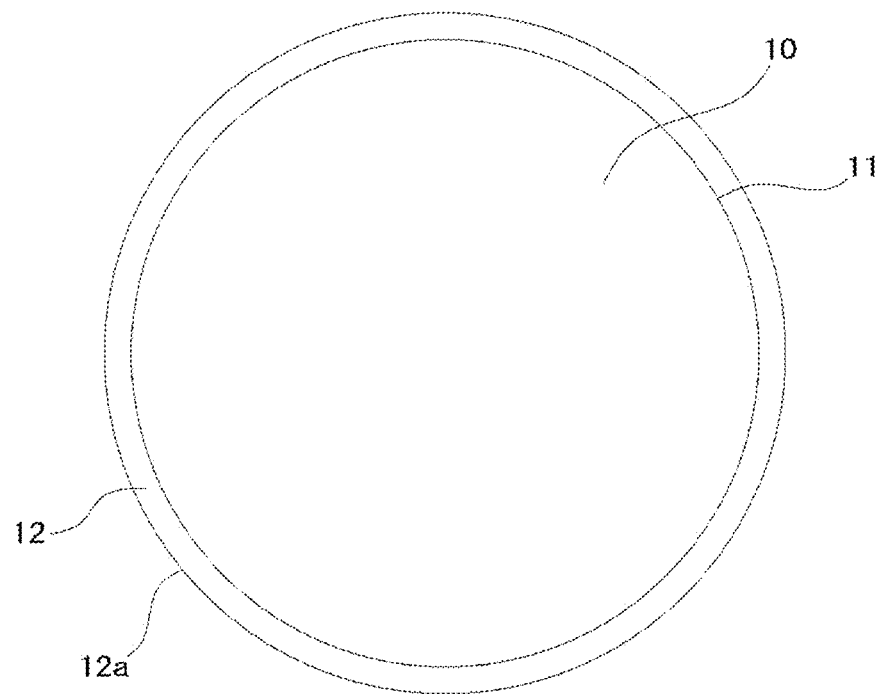

[Fig.3]
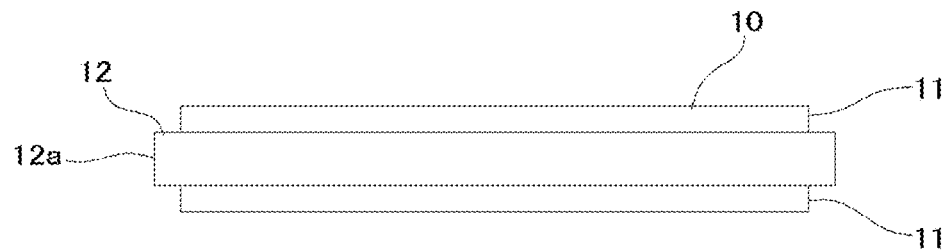
[Fig.4]
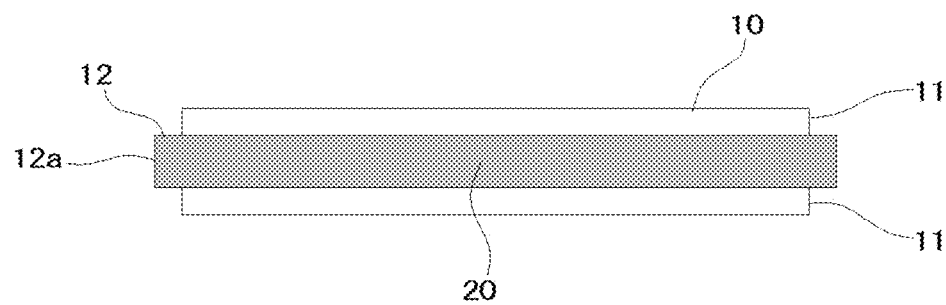
[Fig.5]
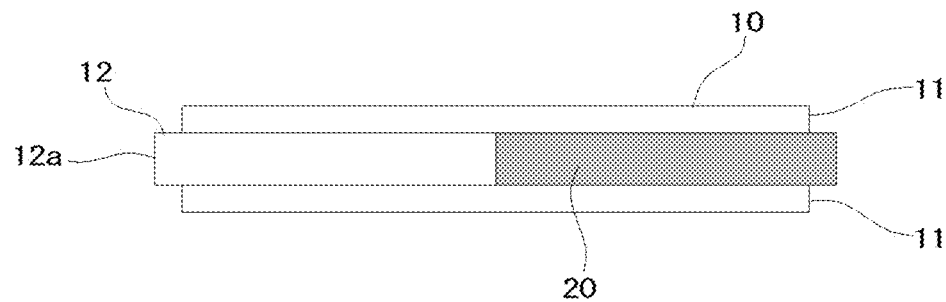

[Fig.6]
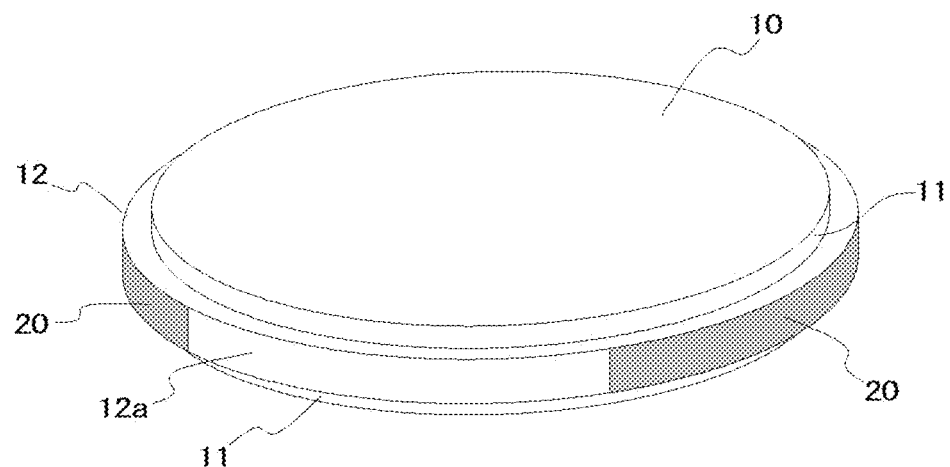
[Fig.7]
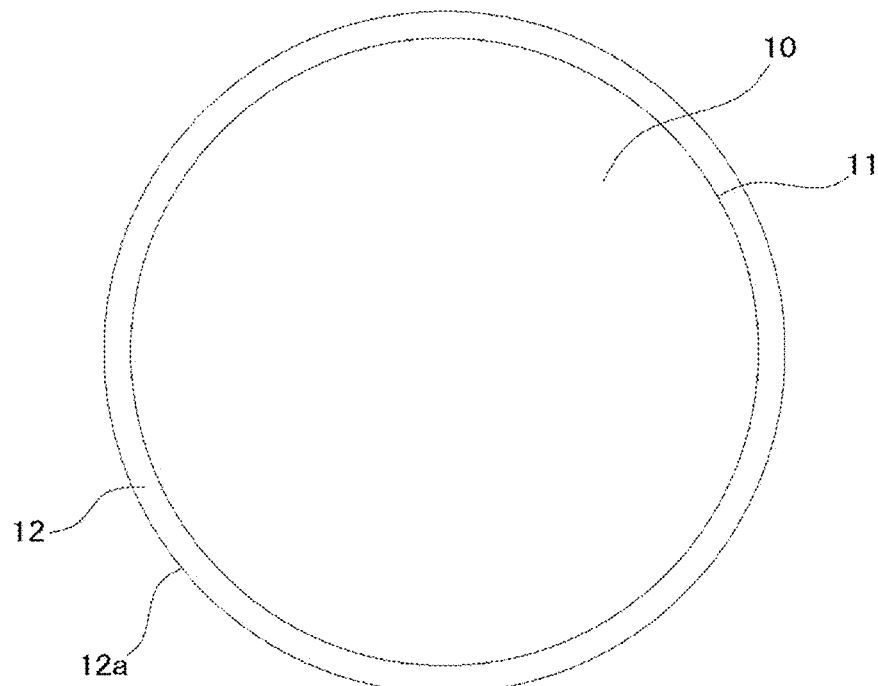

[Fig.8]
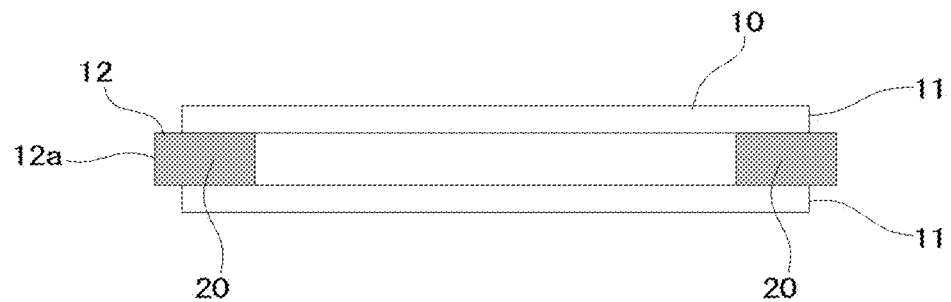
[Fig.9]
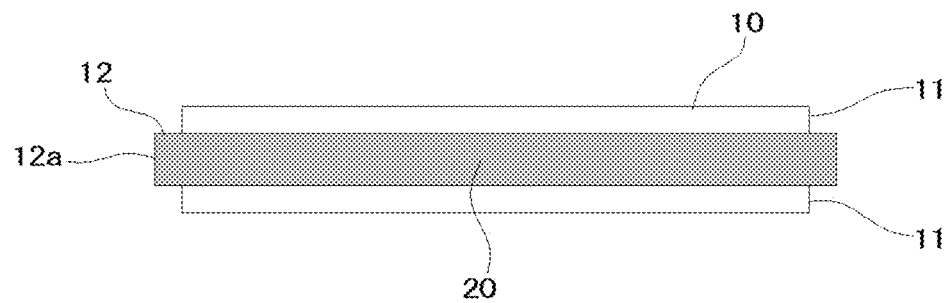
[Fig.10]
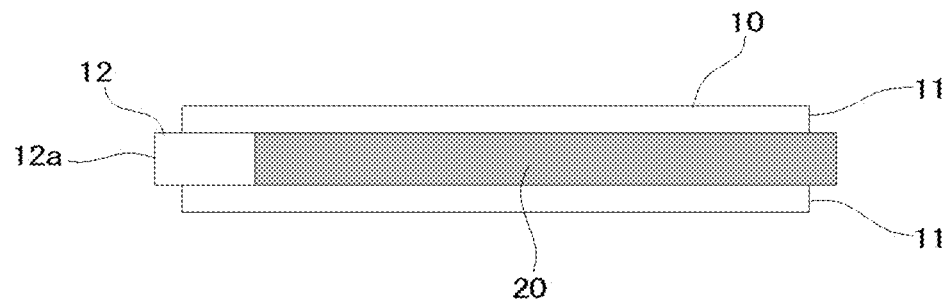

[Fig.11]
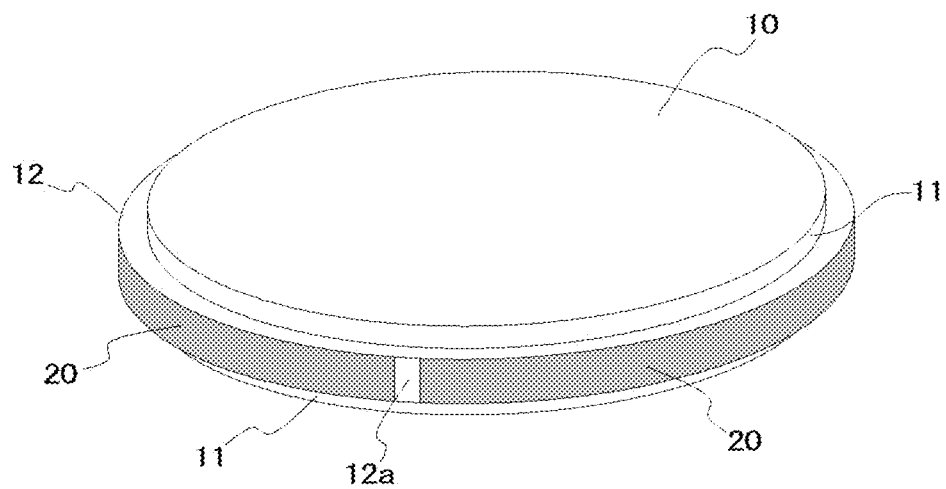
[Fig.12]
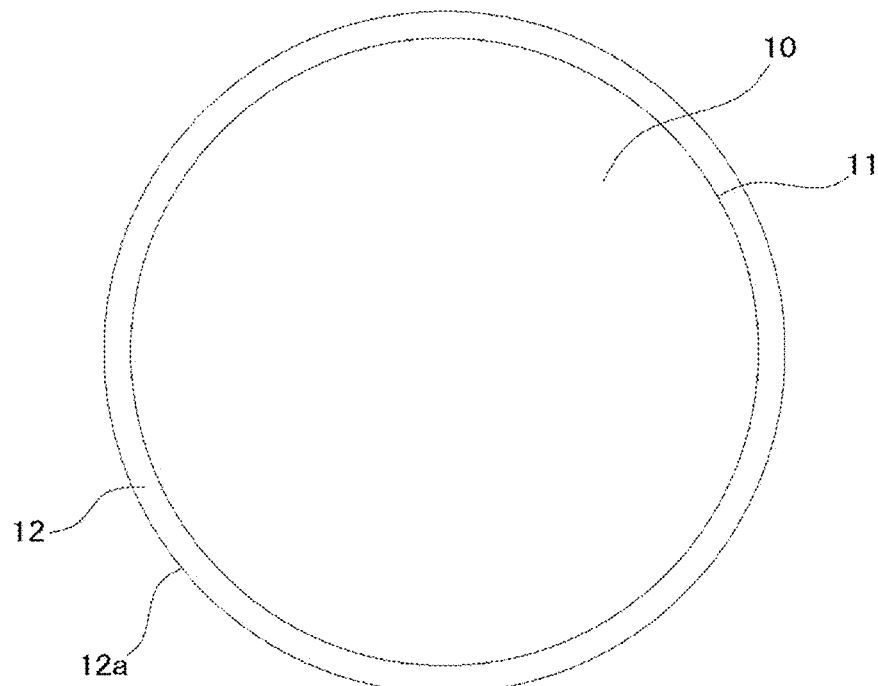

[Fig.13]
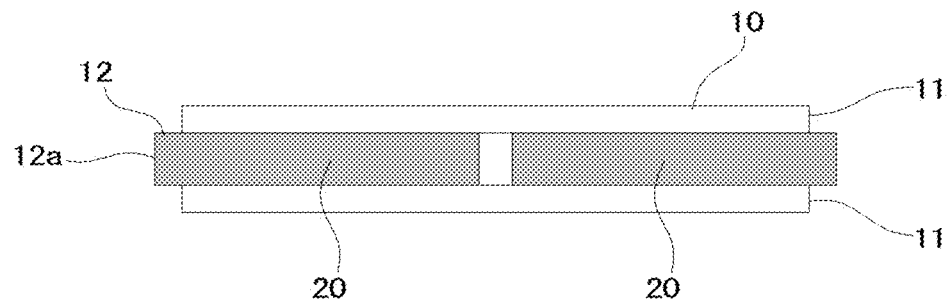
[Fig.14]
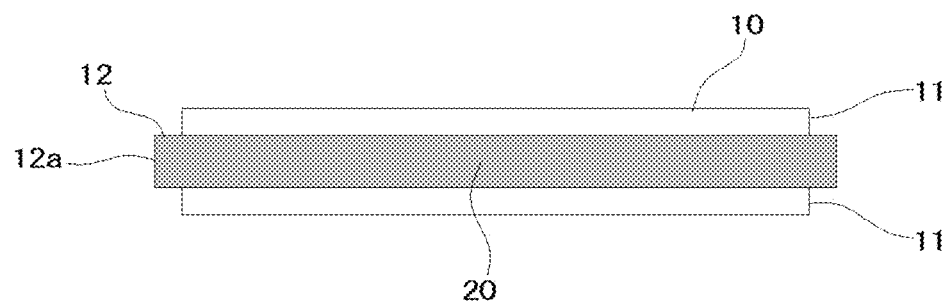
[Fig.15]
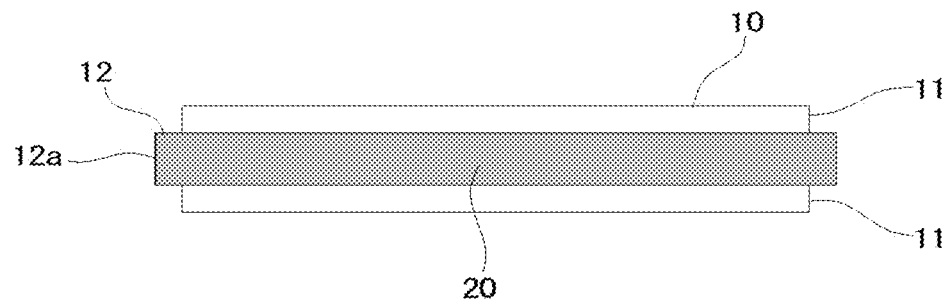

[Fig.16]
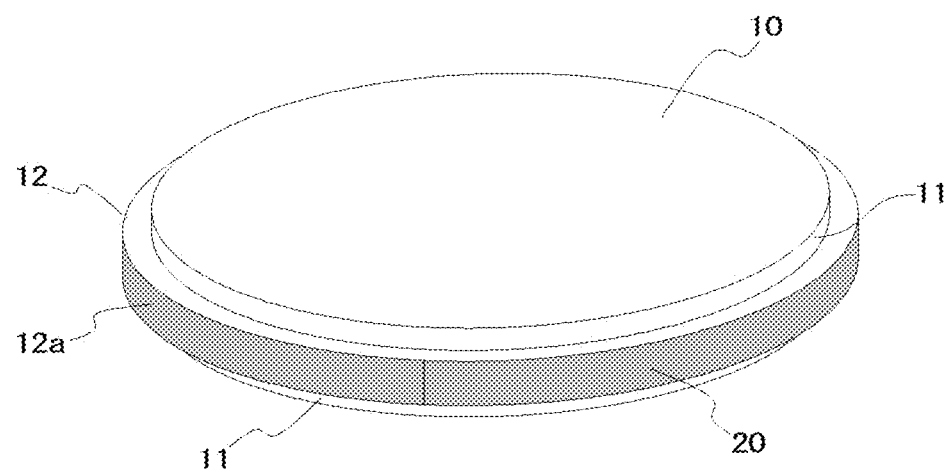
[Fig.17]
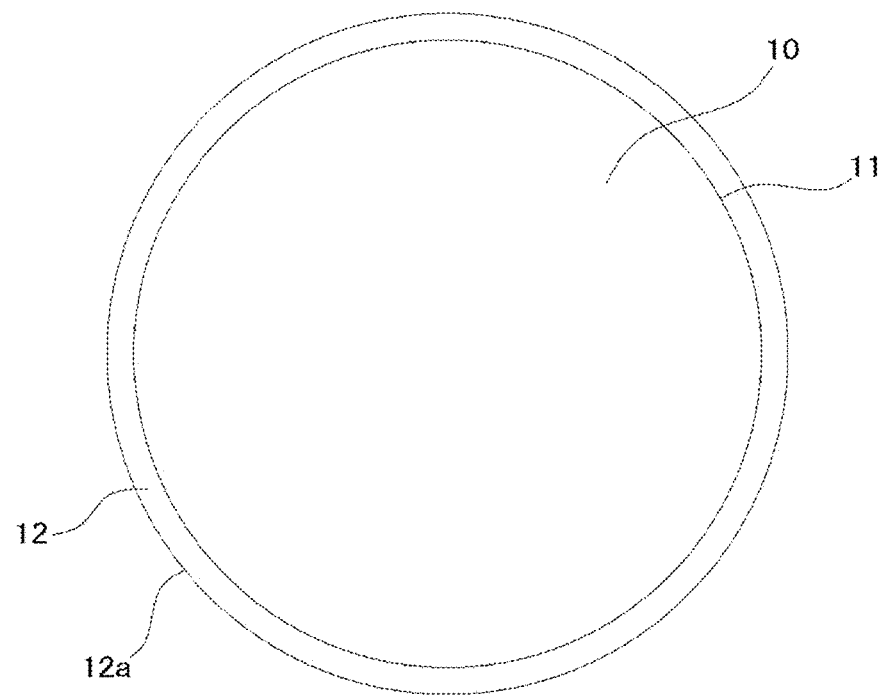

[Fig.18]
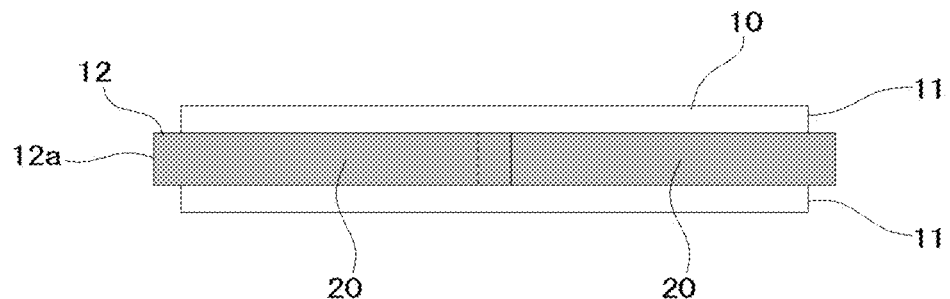
[Fig.19]
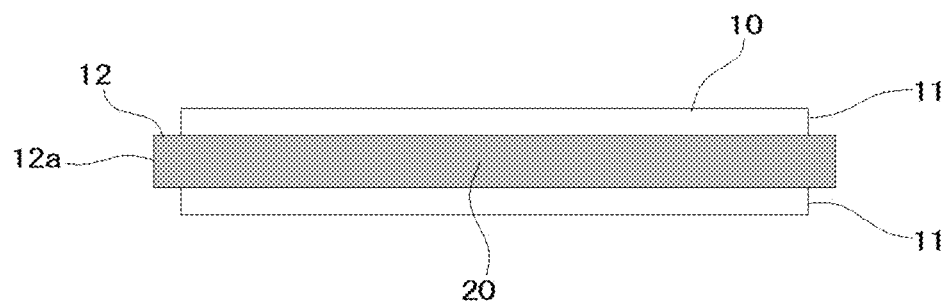
[Fig.20]
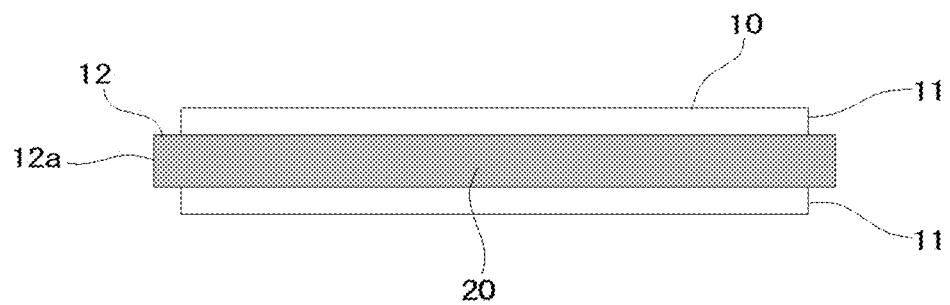

[Fig.21]
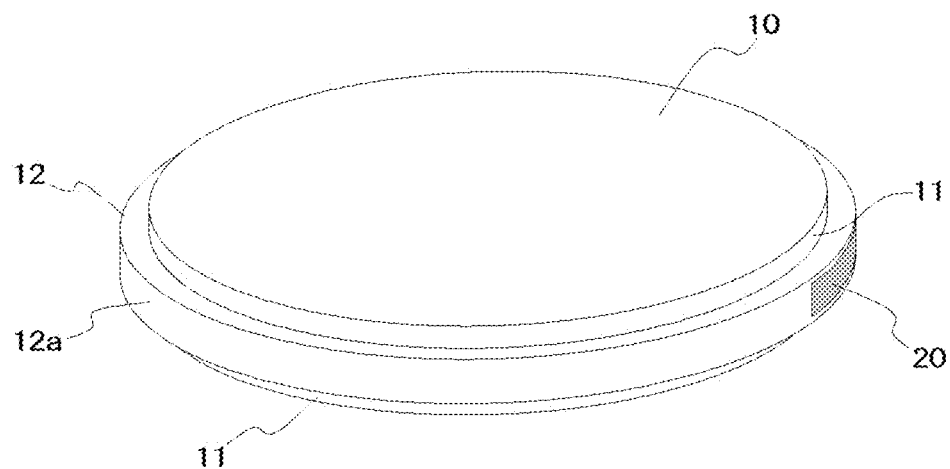
[Fig.22]
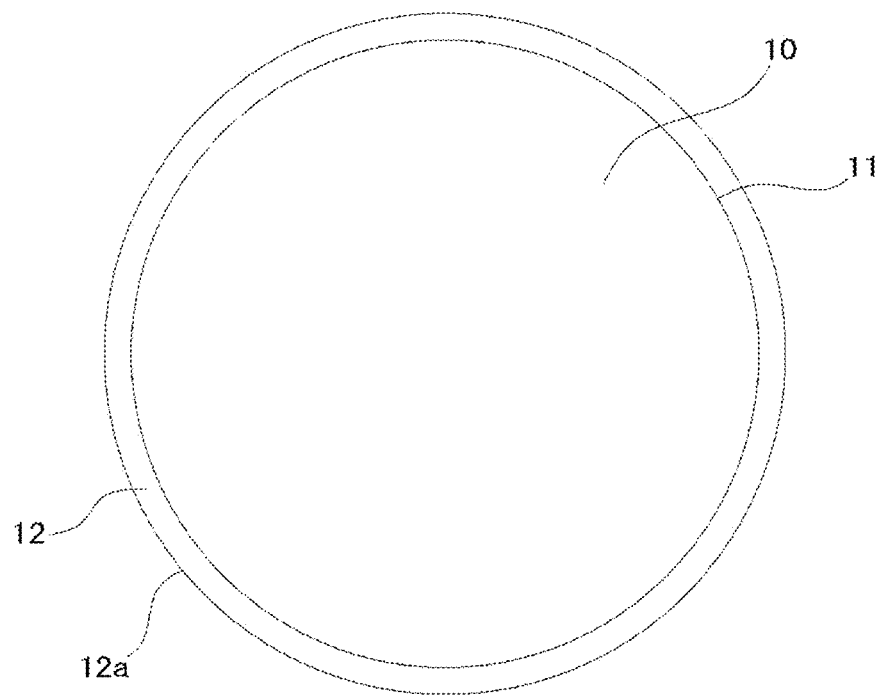

[Fig.23]
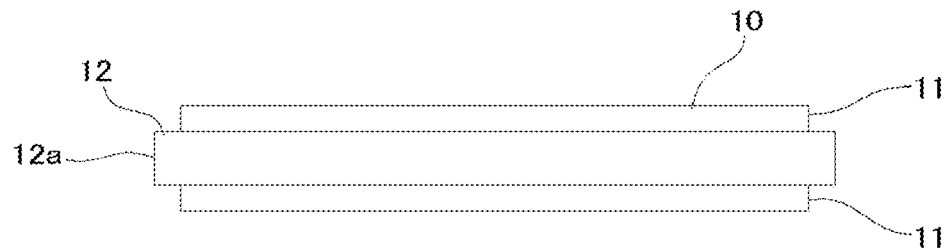
[Fig.24]
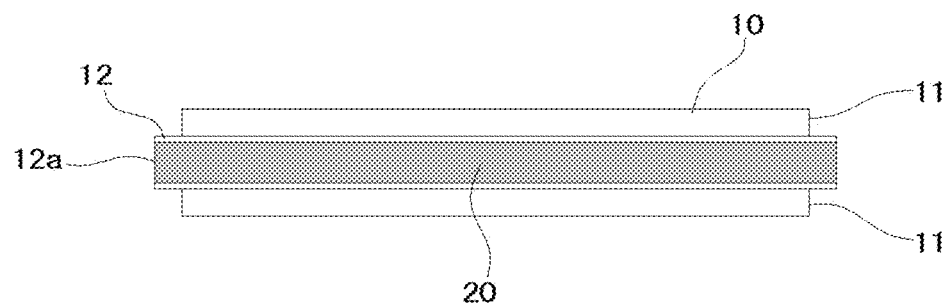
[Fig.25]
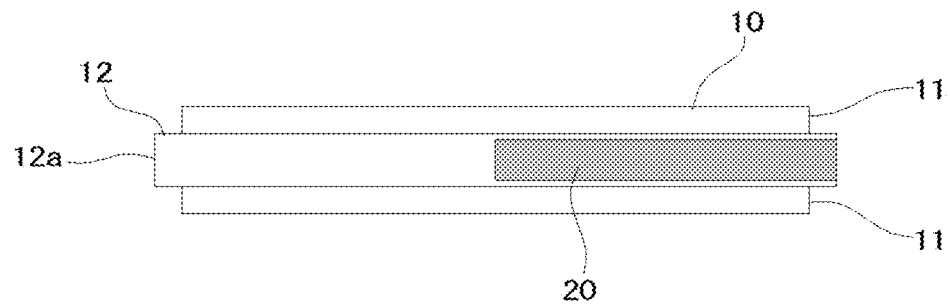

[Fig.26]
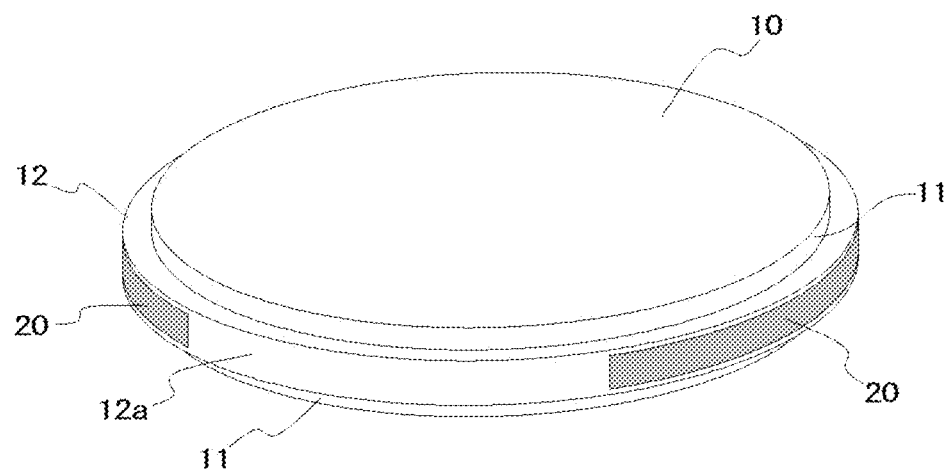
[Fig.27]
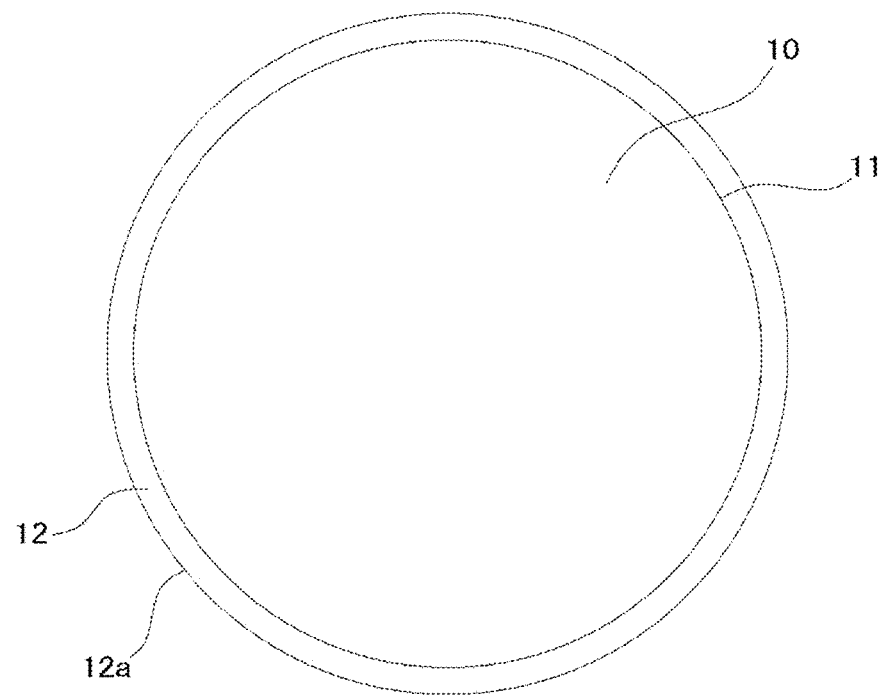

[Fig.28]
[Fig.29]
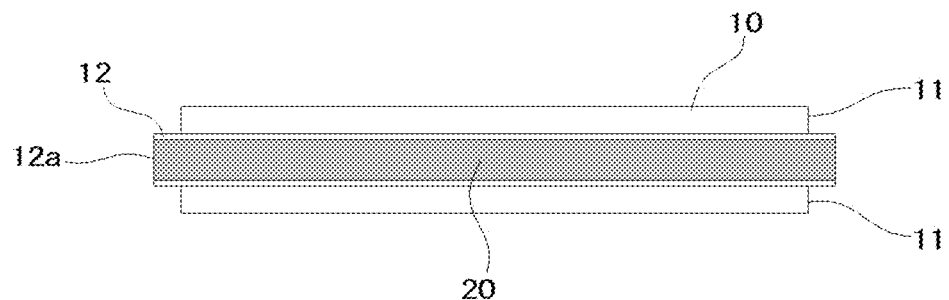
[Fig.30]
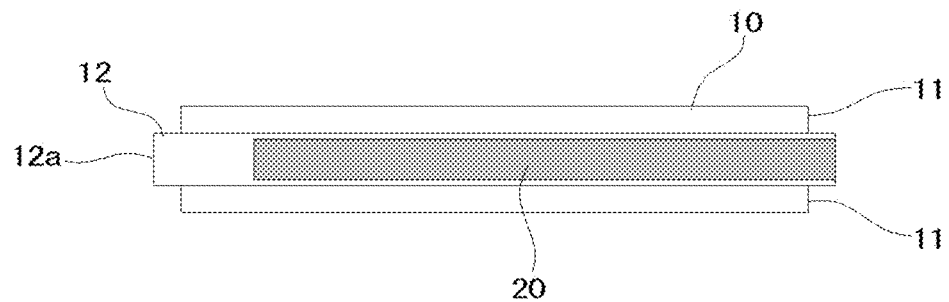

[Fig.31]
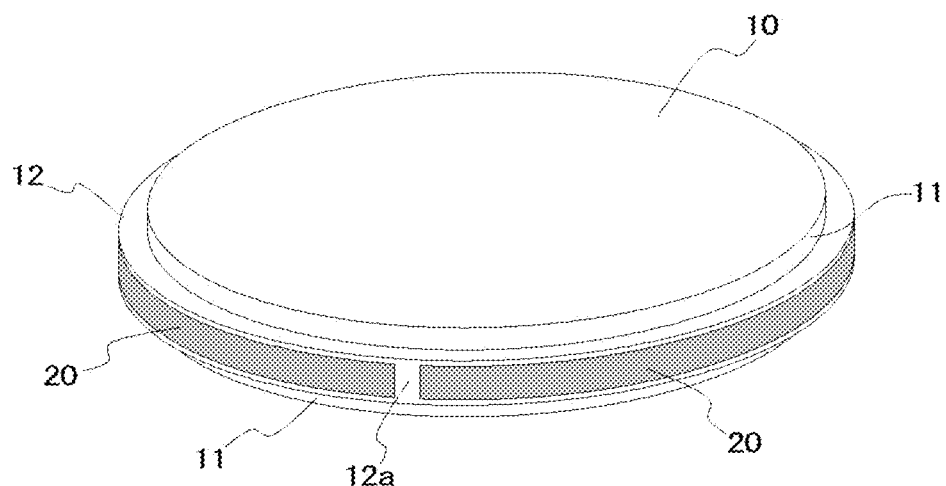
[Fig.32]
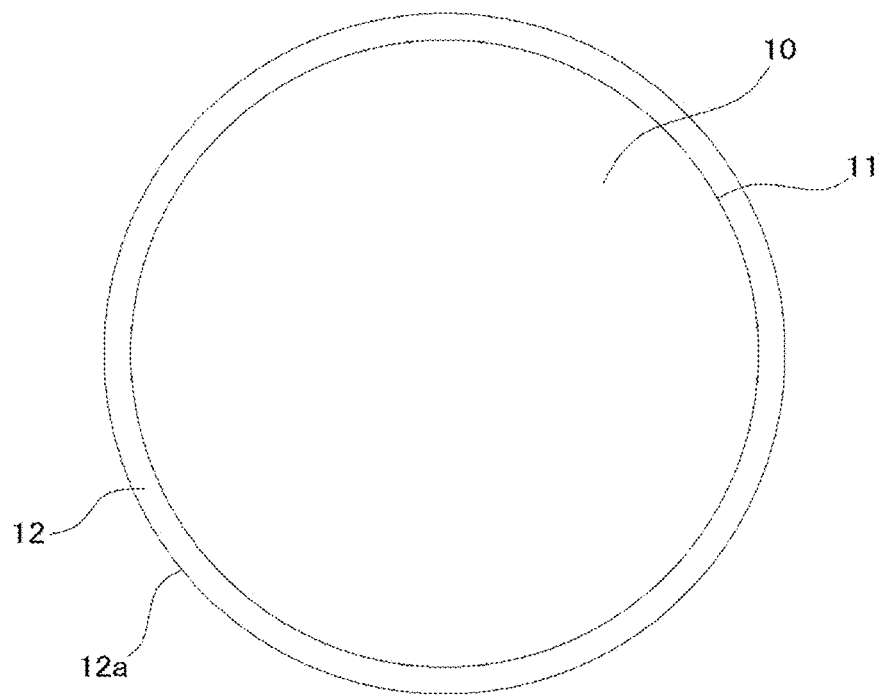

[Fig.33]
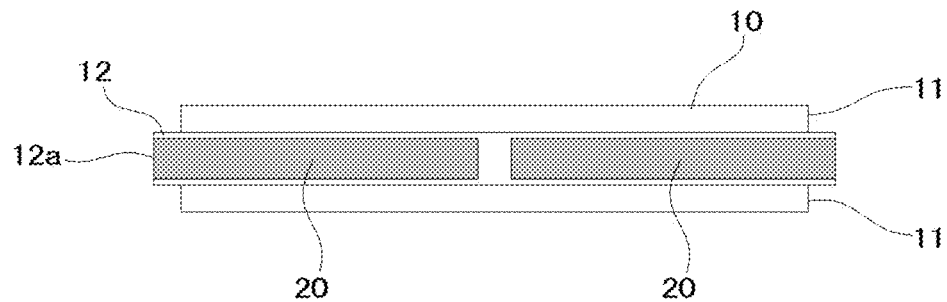
[Fig.34]
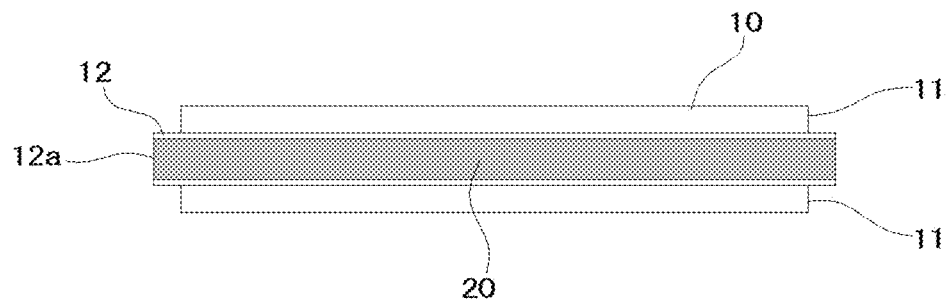
[Fig.35]
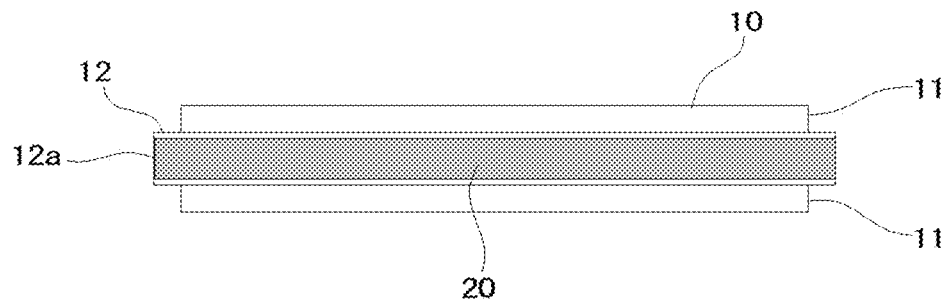

[Fig.36]
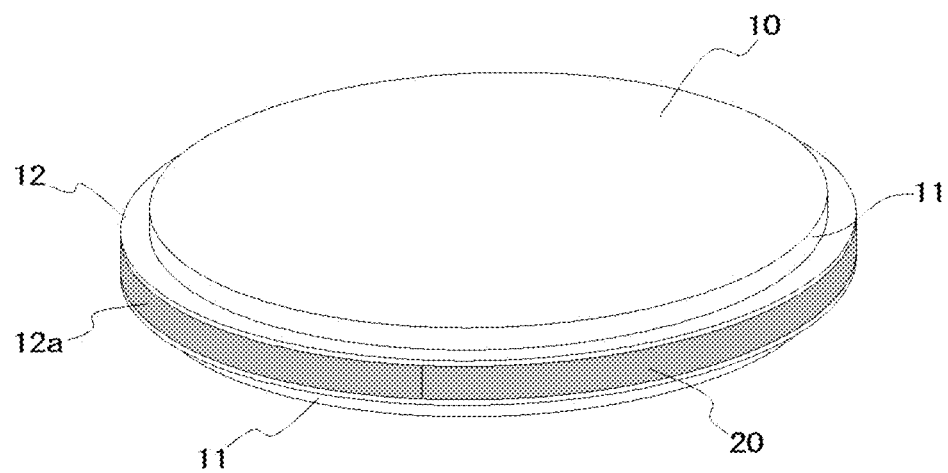
[Fig.37]
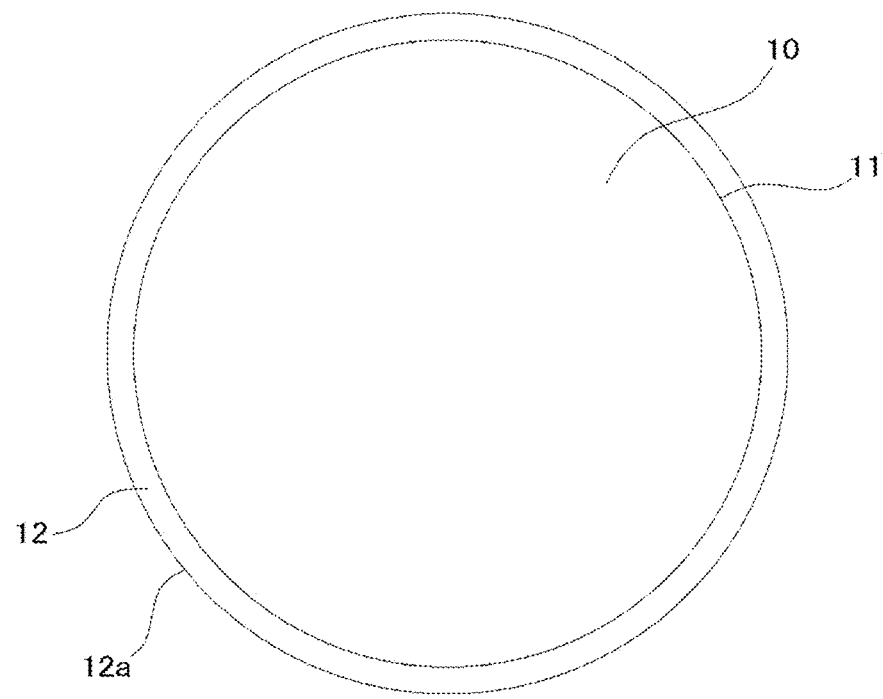

[Fig.38]
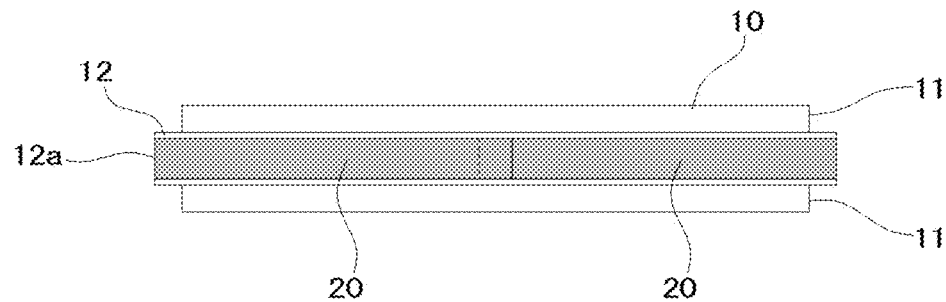
[Fig.39]
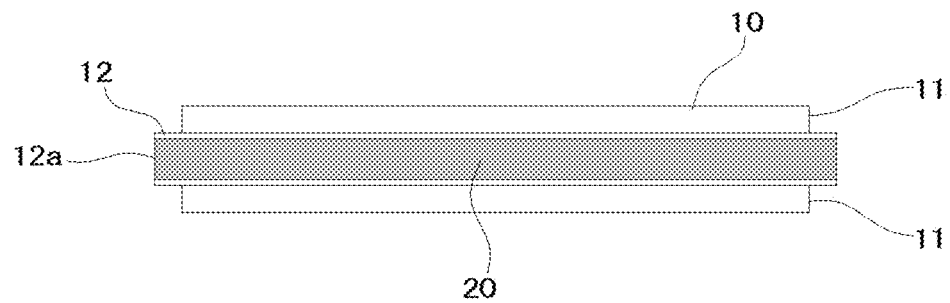
[Fig.40]
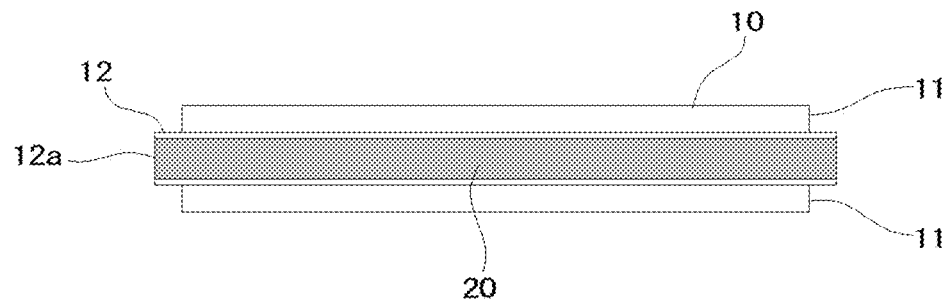

[Fig.41]
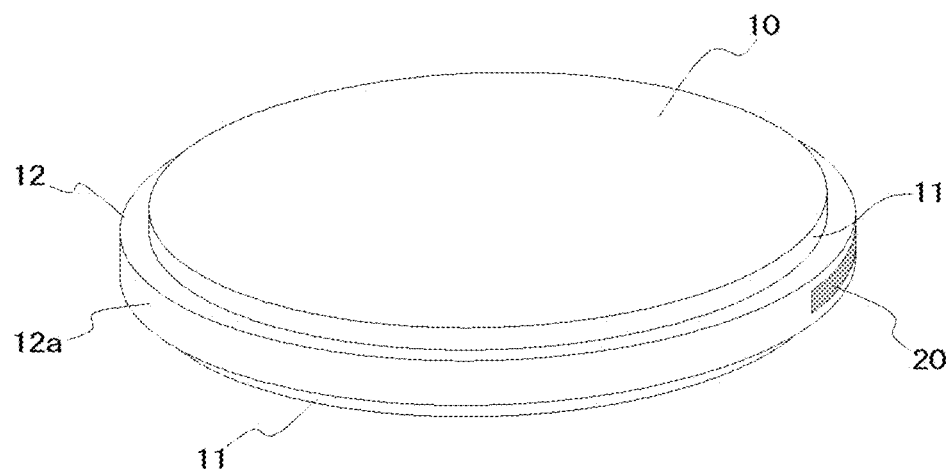
[Fig.42]
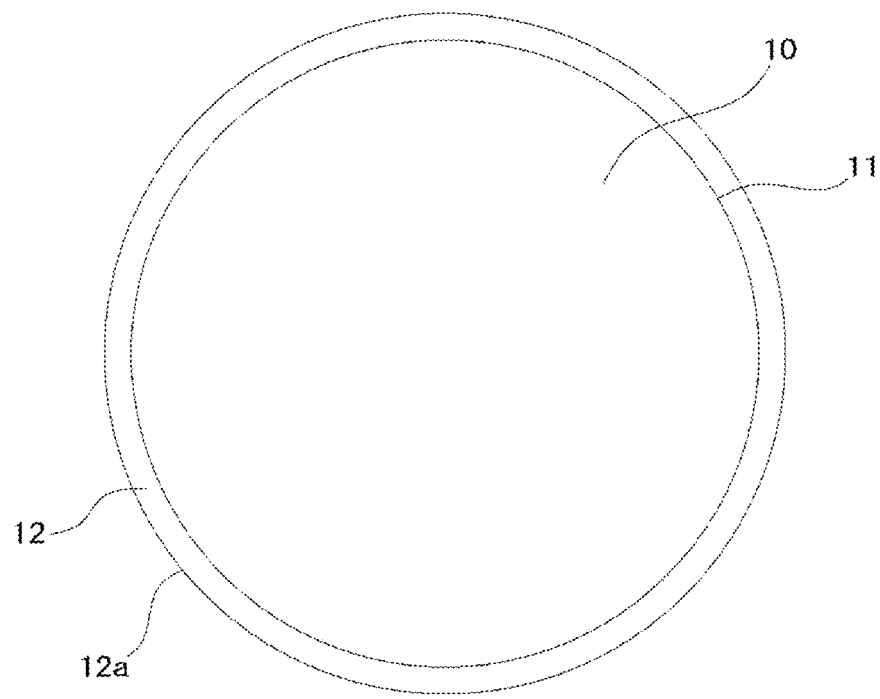

[Fig.43]
[Fig.44]
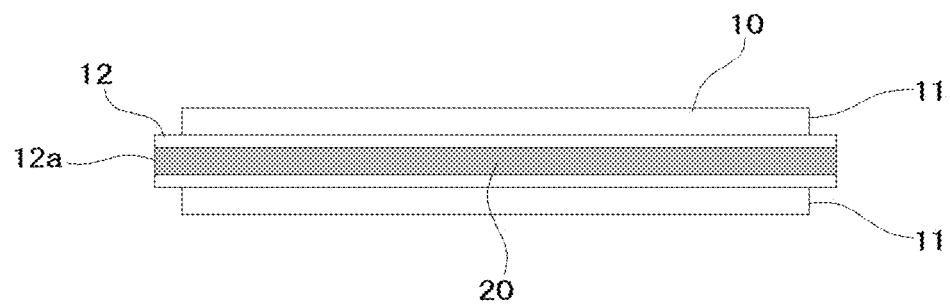
[Fig.45]
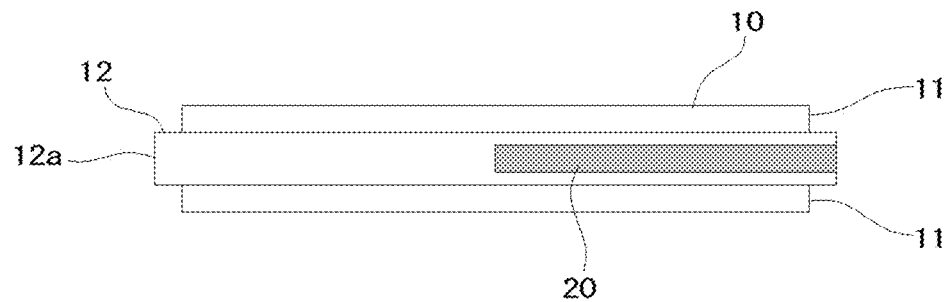

[Fig.46]
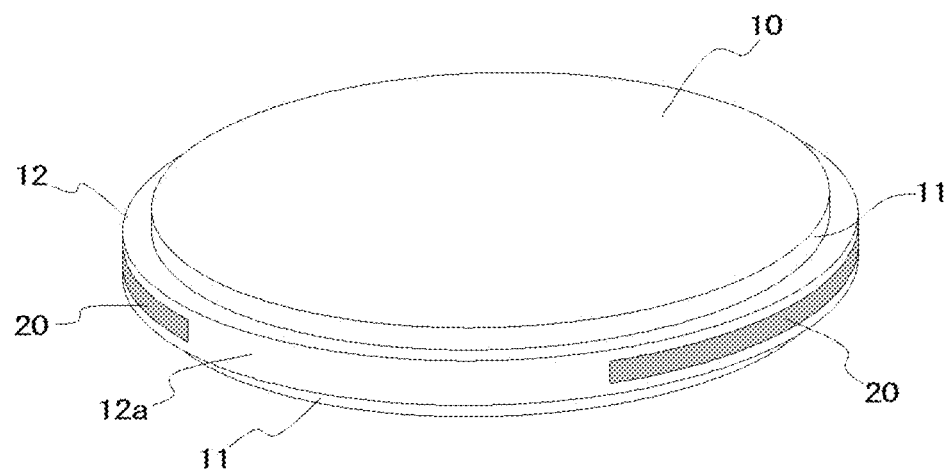
[Fig.47]
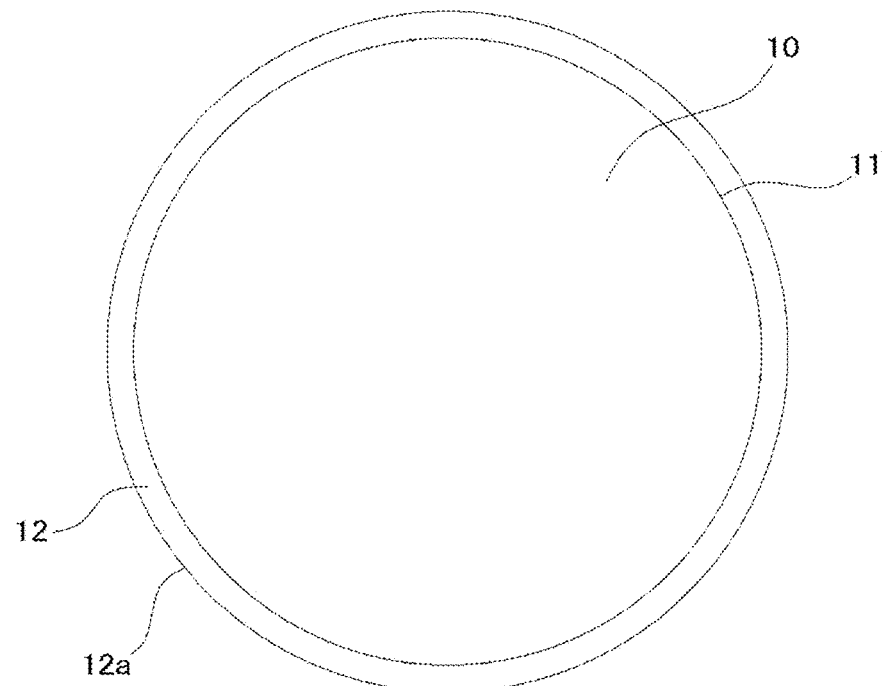

[Fig.48]
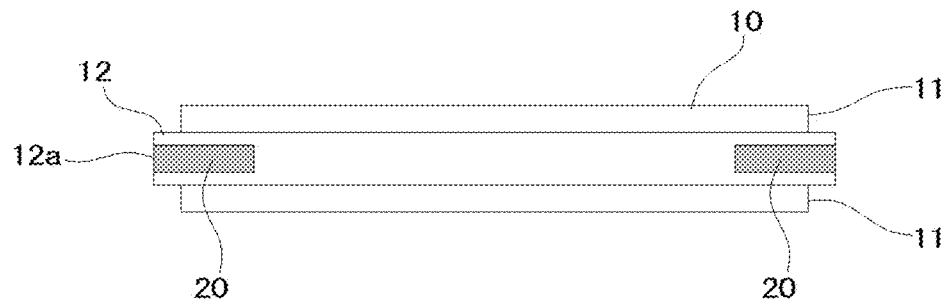
[Fig.49]
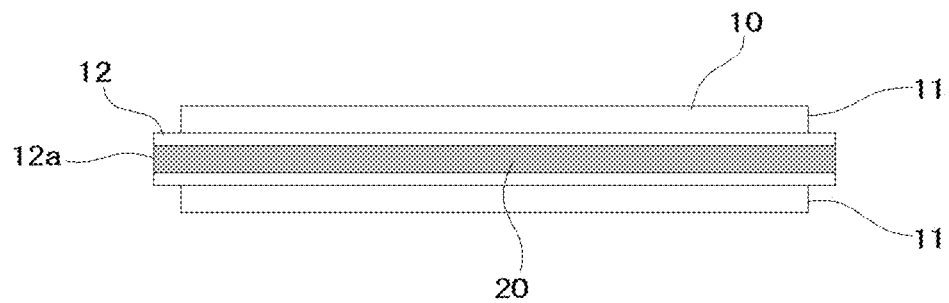
[Fig.50]
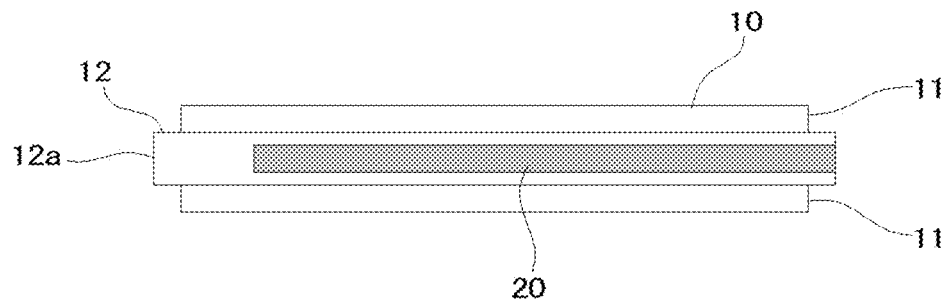

[Fig.51]
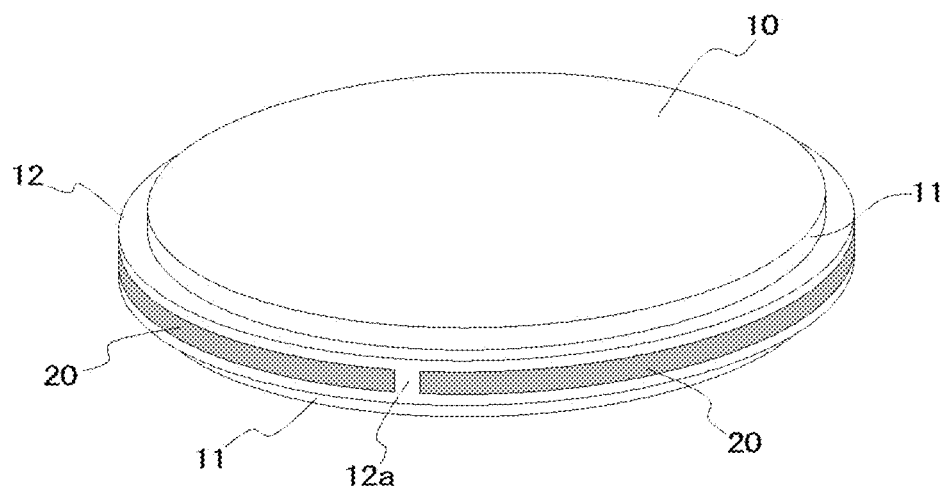
[Fig.52]
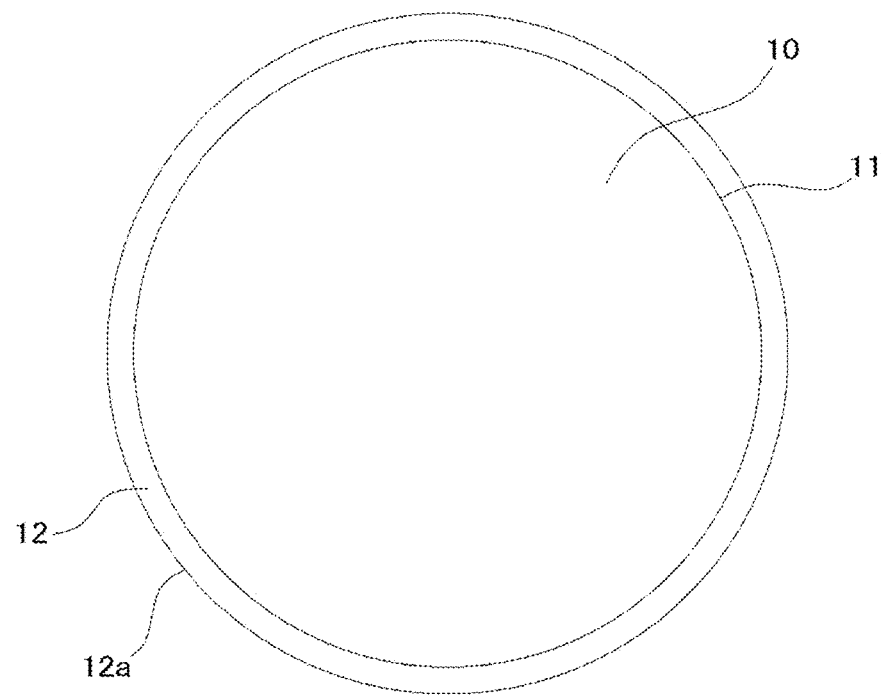

[Fig.53]
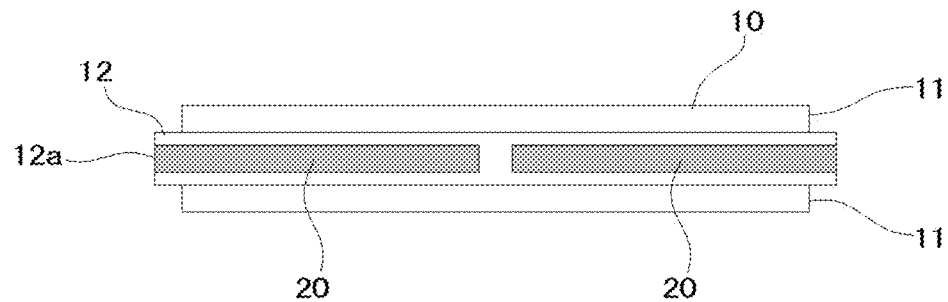
[Fig.54]
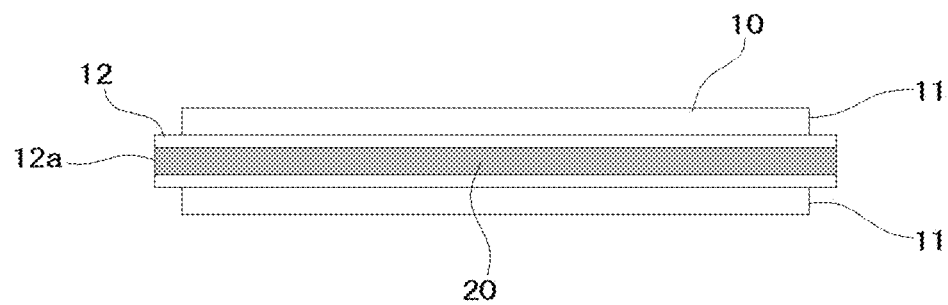
[Fig.55]
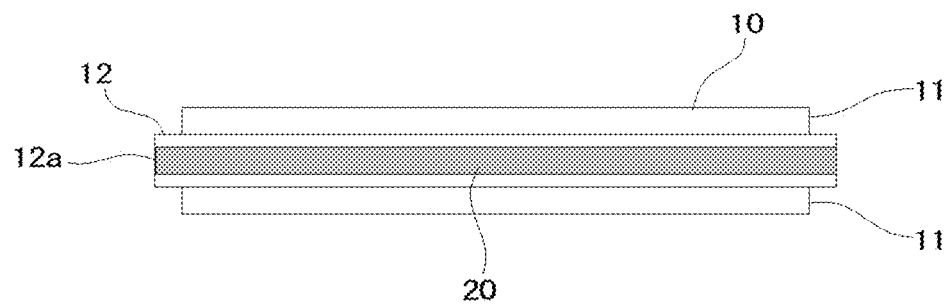

[Fig.56]
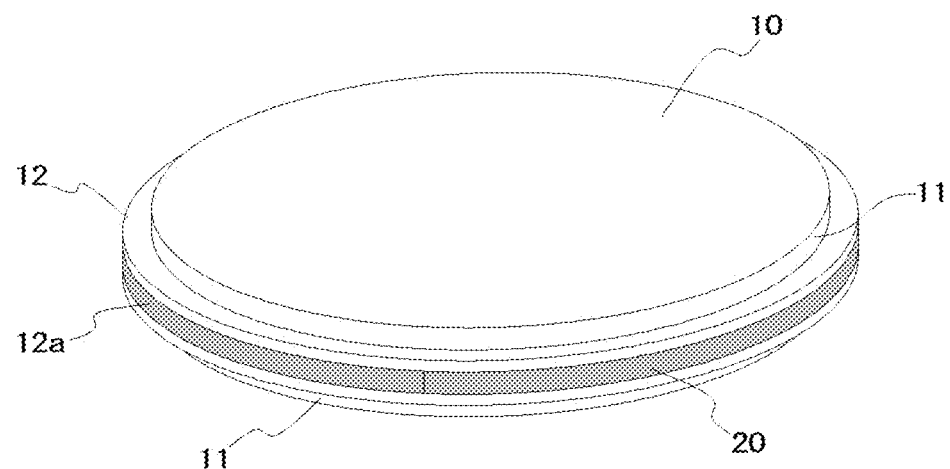
[Fig.57]
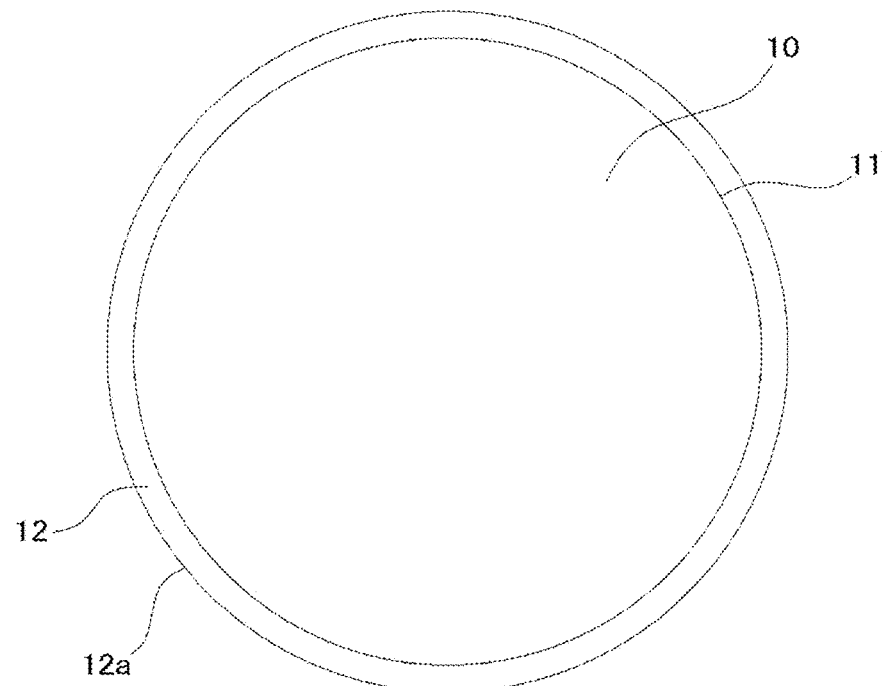

[Fig.58]
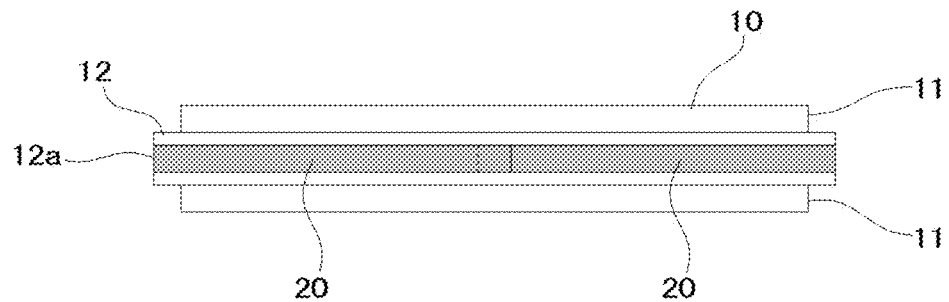
[Fig.59]
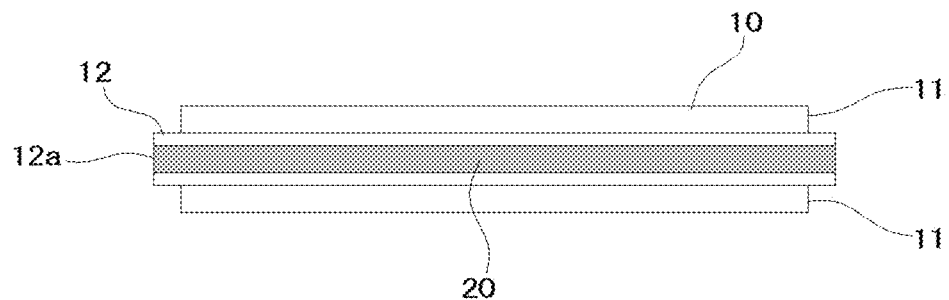
[Fig.60]
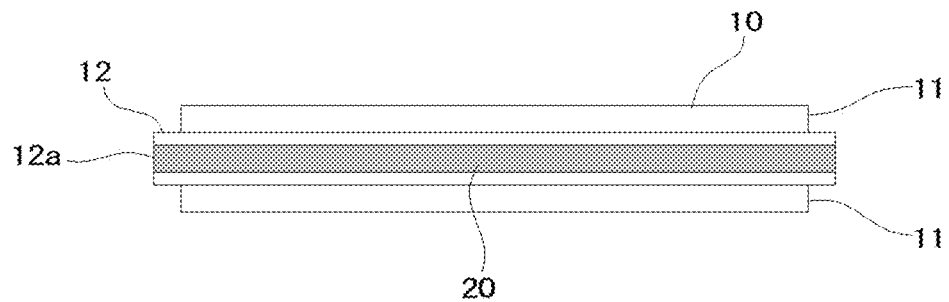

[Fig.61]
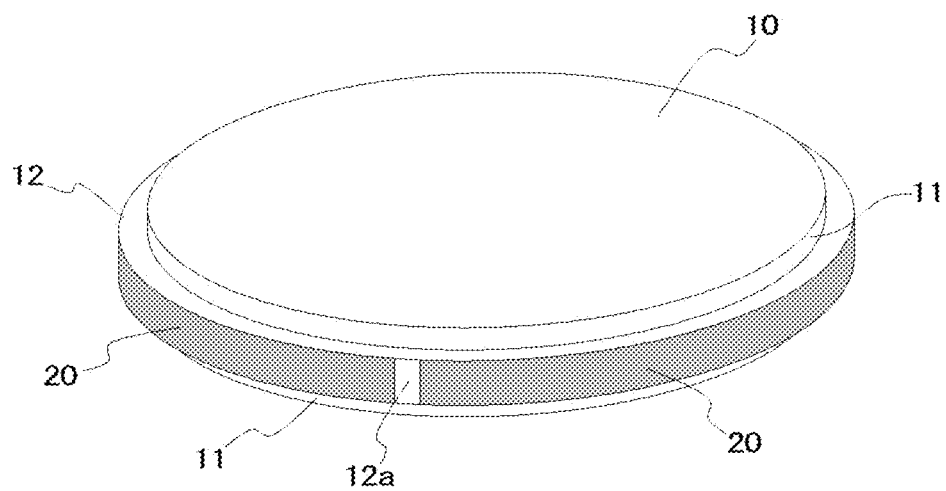
[Fig.62]
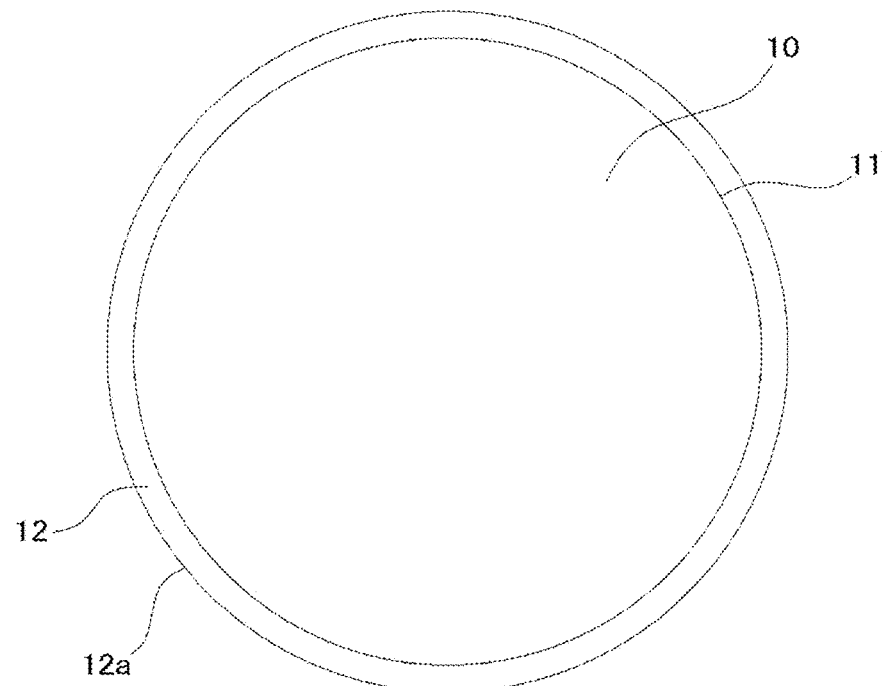

[Fig.63]
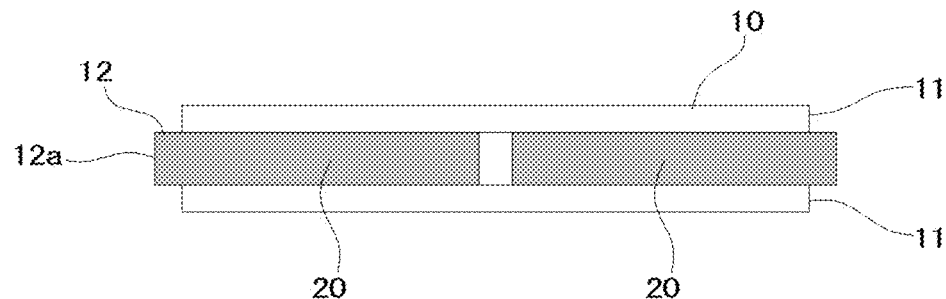
[Fig.64]
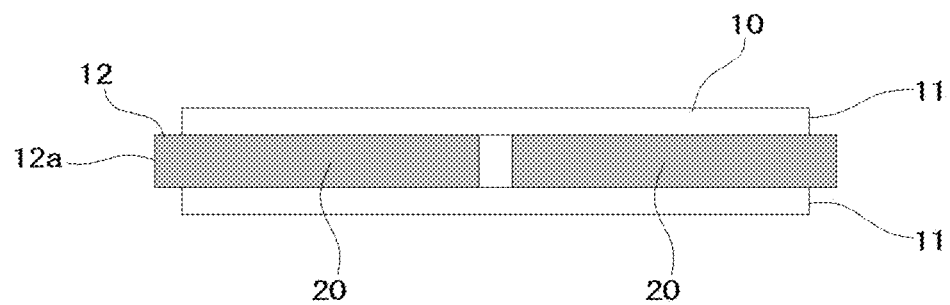
[Fig.65]
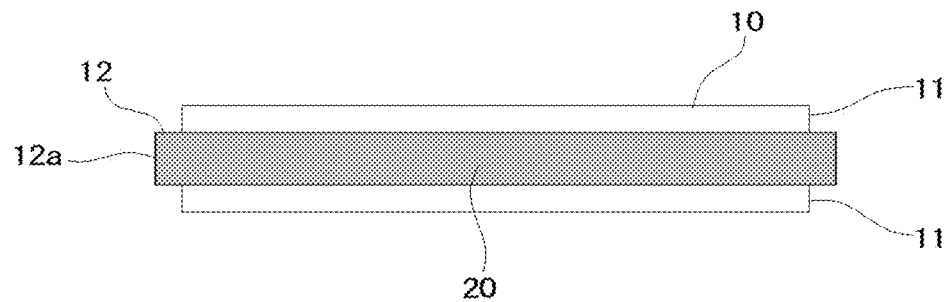

[Fig.66]
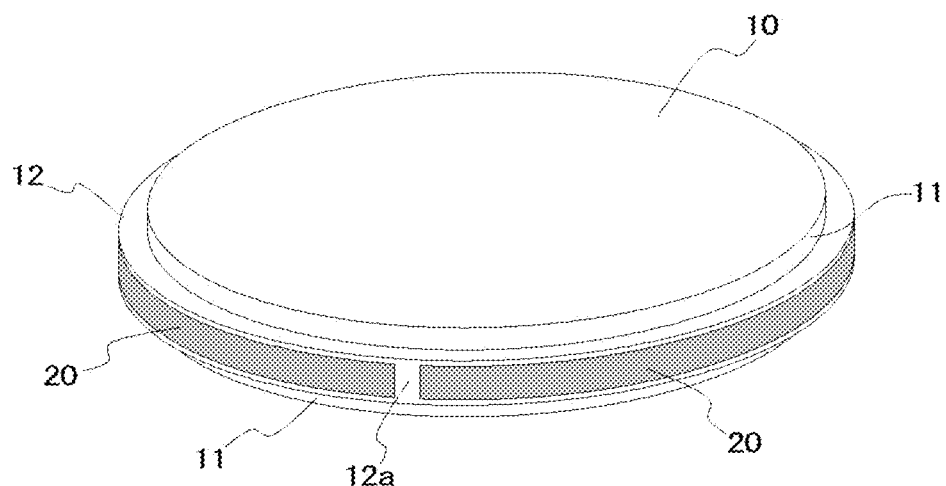
[Fig.67]
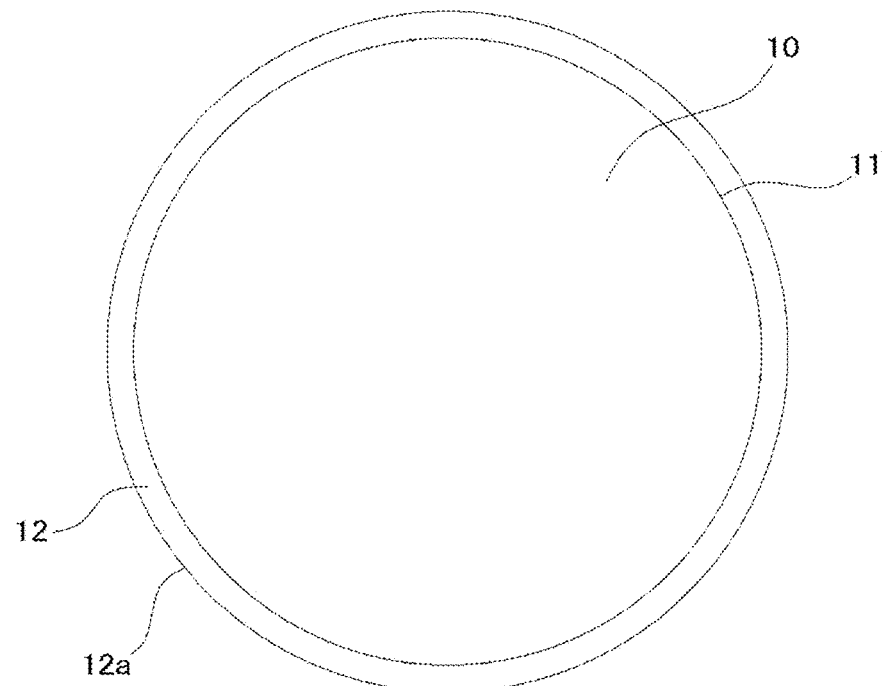

[Fig.68]
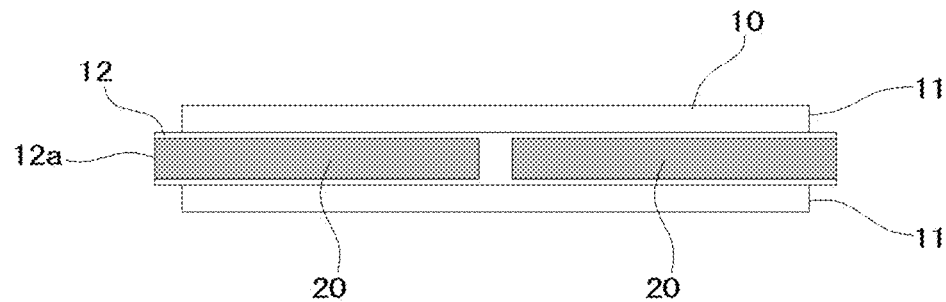
[Fig.69]
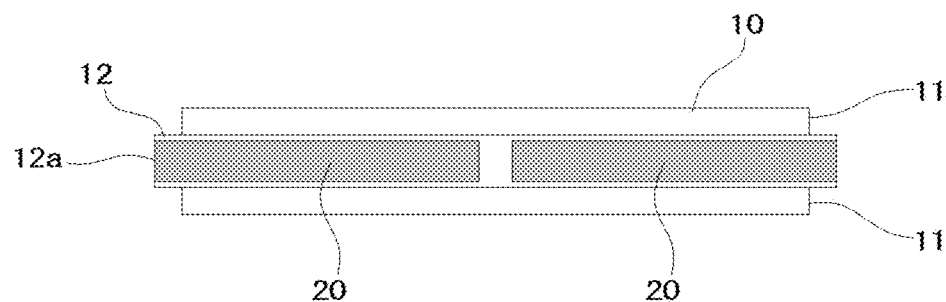
[Fig.70]
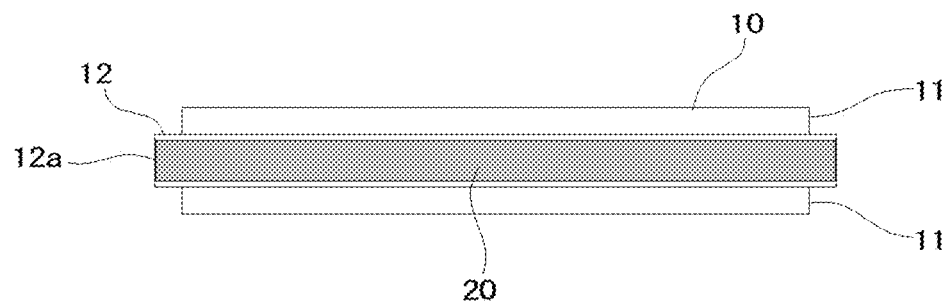

[Fig.71]
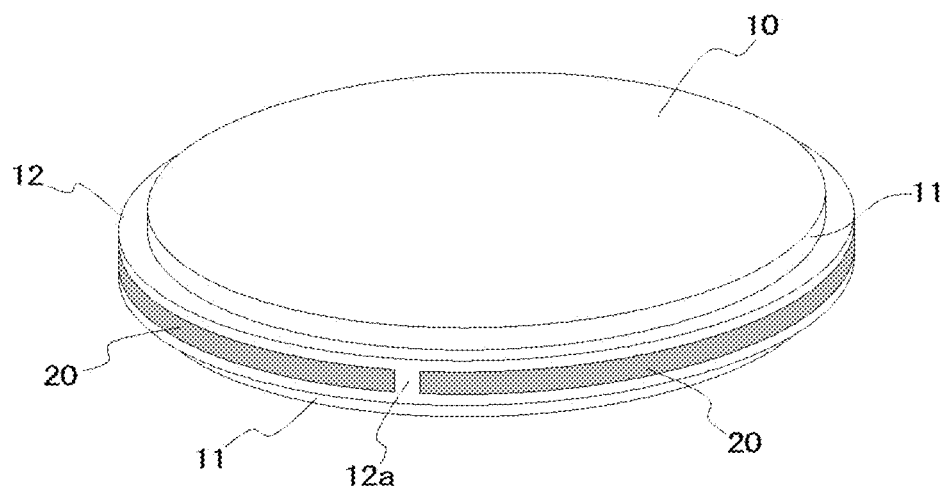
[Fig.72]
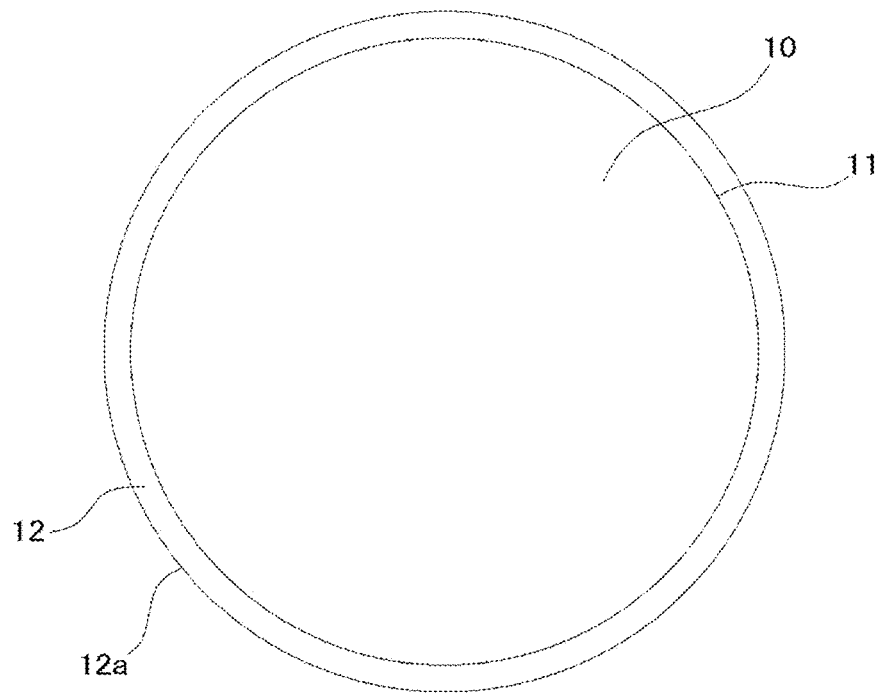

[Fig.73]
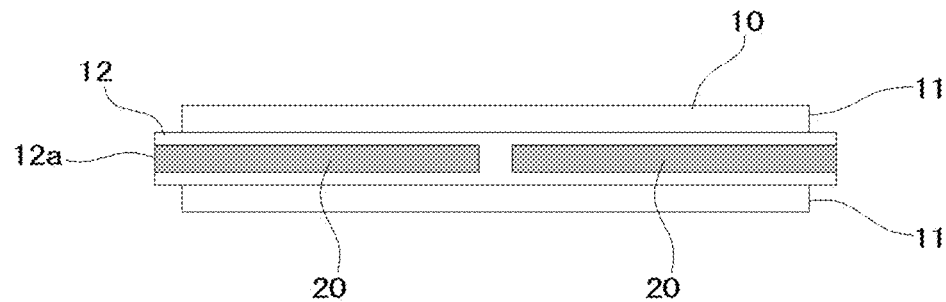
[Fig.74]
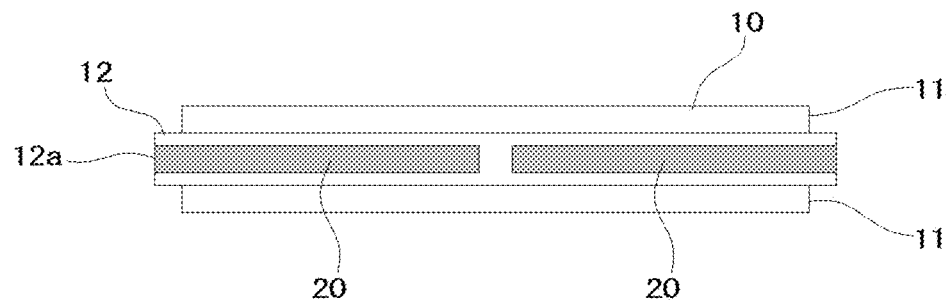
[Fig.75]
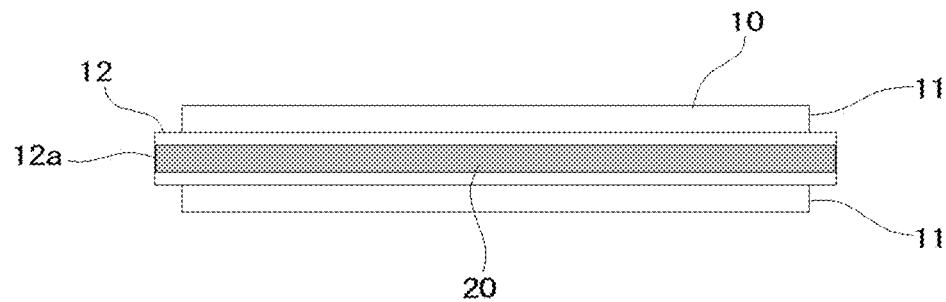

[Fig.76]
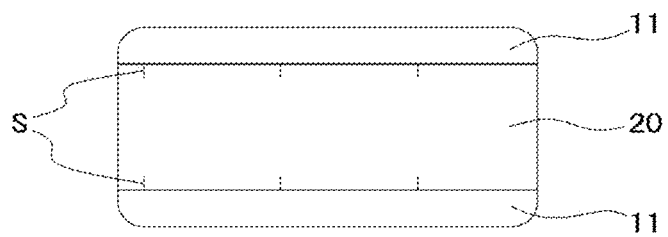
[Fig.77]
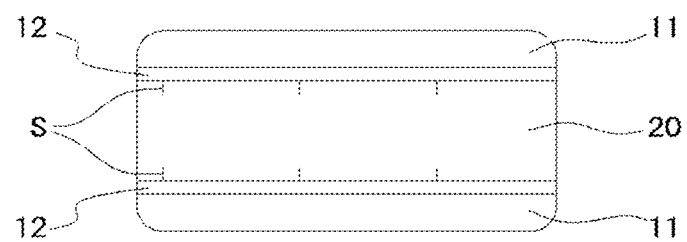
[Fig.78]
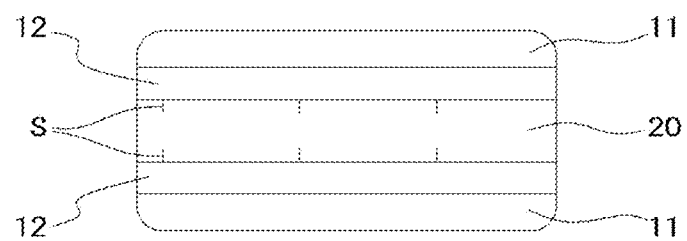

[Fig.79]
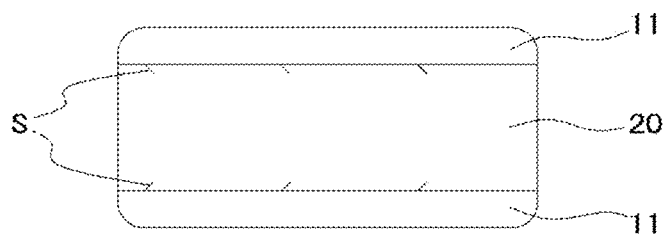
[Fig.80]
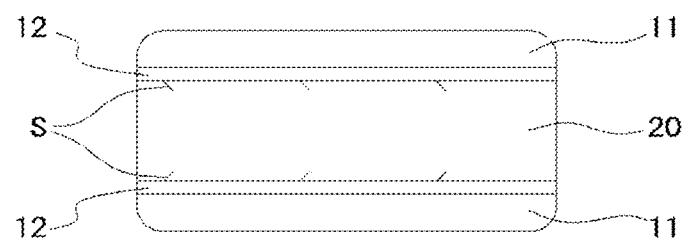
[Fig.81]
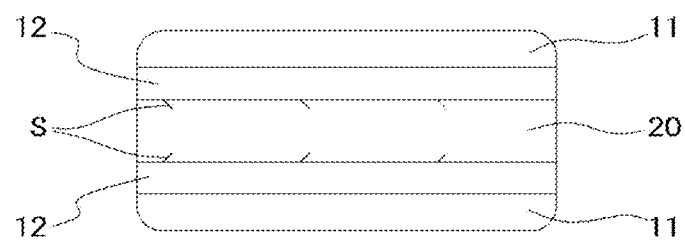

[Fig.82]
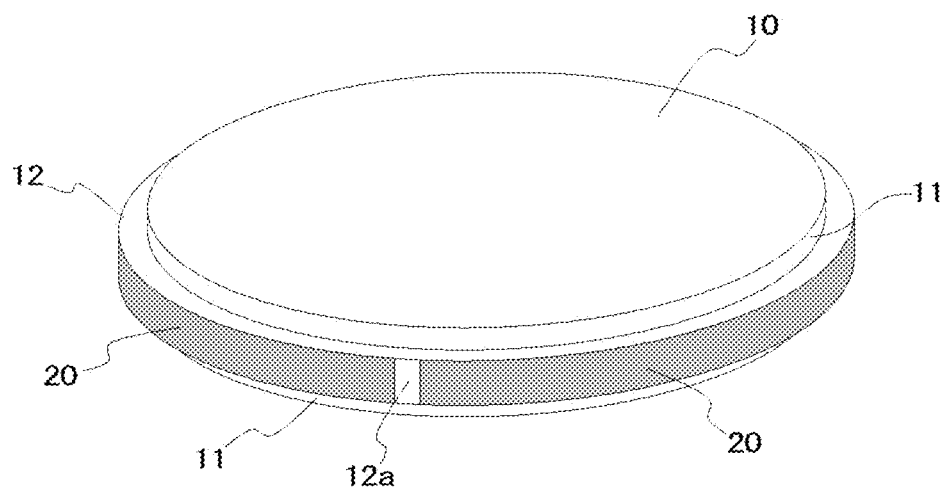
[Fig.83]
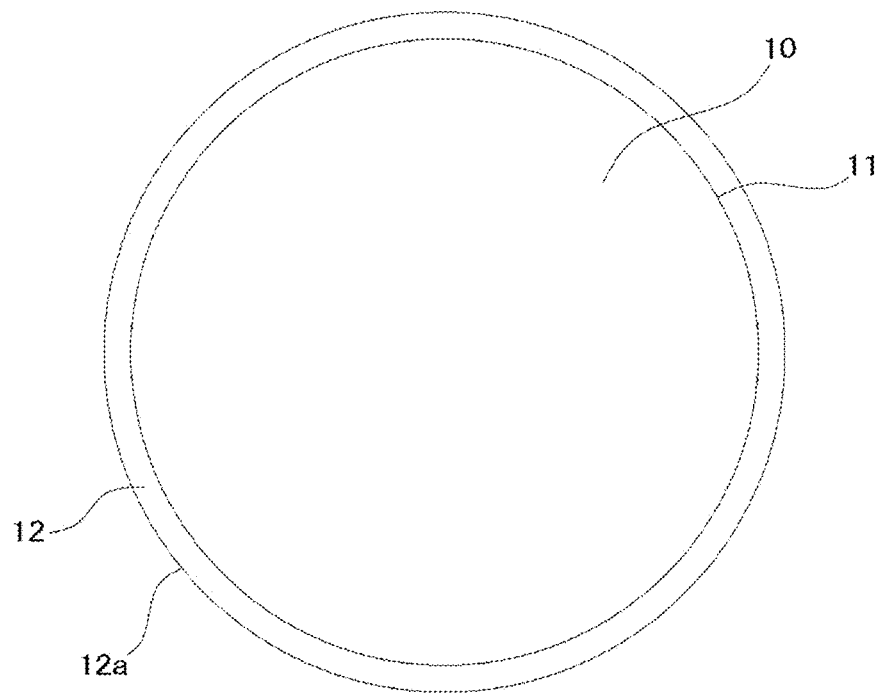

[Fig.84]
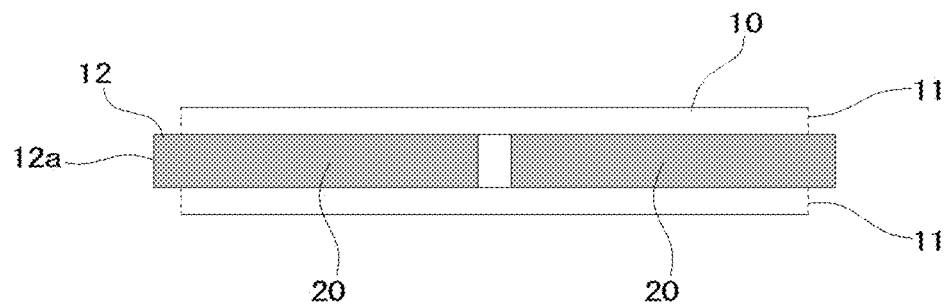
[Fig.85]
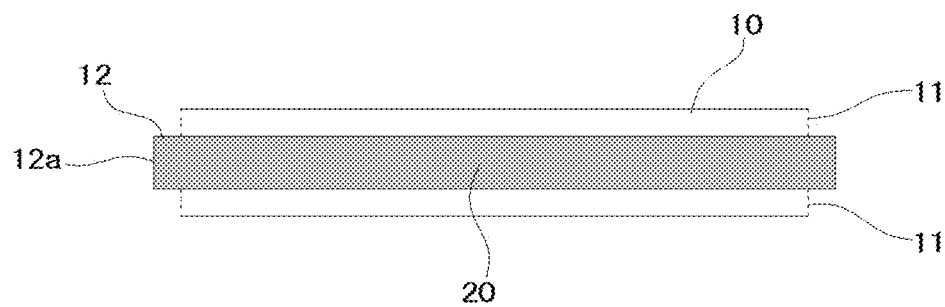
[Fig.86]
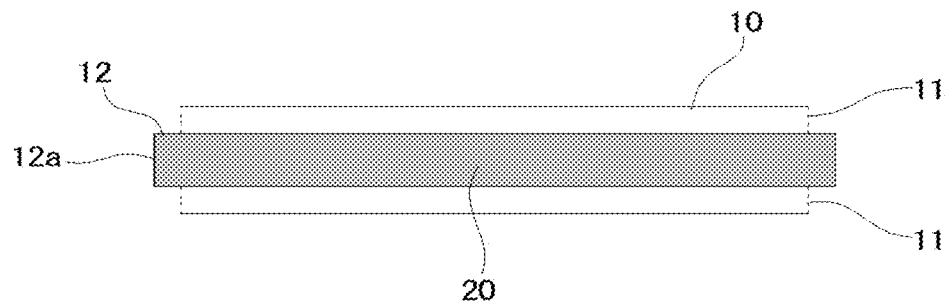

[Fig.87]
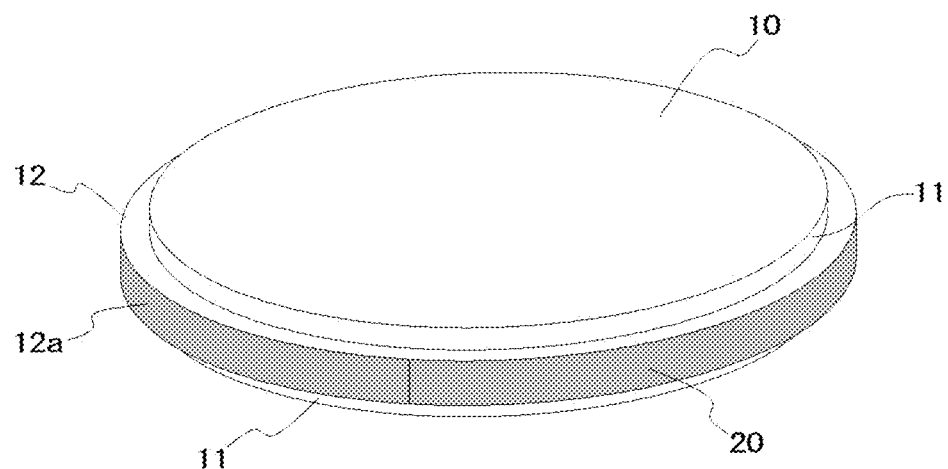
[Fig.88]
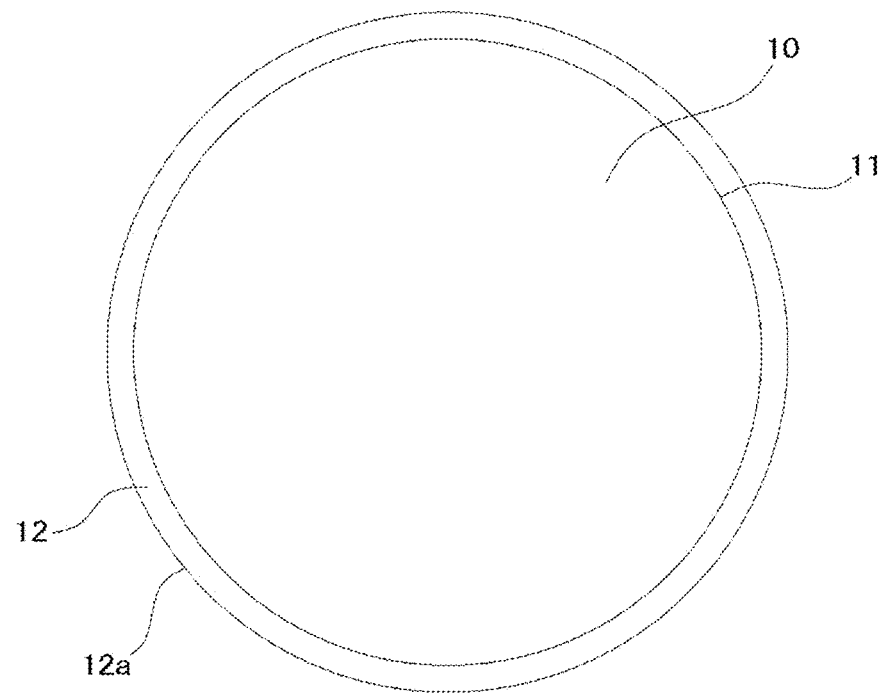

[Fig.89]
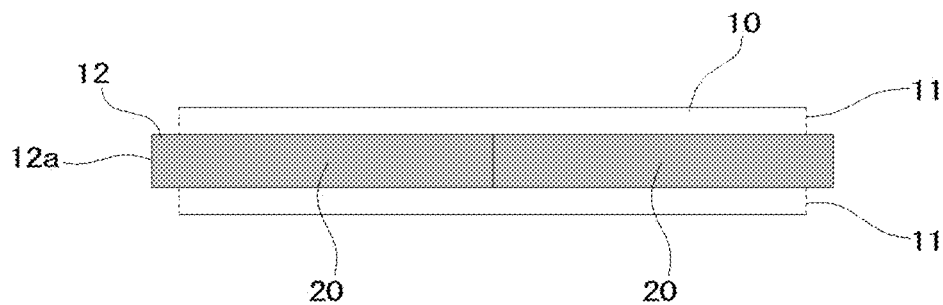
[Fig.90]
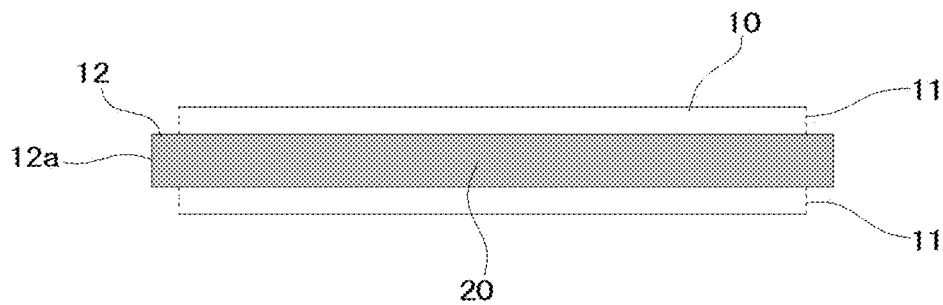
[Fig.91]
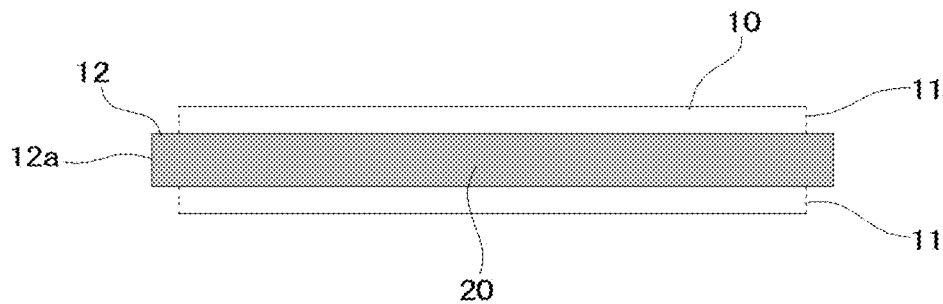

CERAMIC MILL BLANK FOR DENTAL CUTTING AND MACHINING

CROSS-REFERENCE TO RELATED APPLICATIONS

This application is based on and claims the benefit of priorities from Japanese Patent Application Serial No. 2022-130276 (filed on Aug. 17, 2022) and Japanese Patent Application Serial No. 2023-079733 (filed on May 12, 2023), the contents of which are hereby incorporated by reference in their entirety.

BACKGROUND OF THE INVENTION

Field of the Invention

The present invention relates to a ceramic mill blank for dental cutting and machining.

Description of the Related Art

In recent years, techniques to prepare a prosthesis device by using the dental CAD/CAM system has been spread rapidly. Generally in this system, a disk-shaped or block-shaped mill blank (blank) is installed in a dental milling machine, and cutting and machining are performed.

There are various materials for this mill blank, including metal materials such as titanium alloys, ceramic materials such as zirconia, alumina and lithium disilicate, and resin materials such as acrylic resin and hybrid resin and various prosthetic devices can be manufactured by selecting the material of the mill blank depending on the purpose.

Among them, zirconia has been clinically applied in various cases because of its high strength. However, the perfect sintered zirconia has very high hardness and therefore it is difficult to cut and machine using a dental milling machine. Thus, a zirconia which is not perfect sintered but is calcined at a low firing temperature to adjust to a hardness that enables to cut and machine has been used as a zirconia mill blank for dental cutting and machining.

A method of installing a mill blank made of a ceramic material which is not perfect sintered in a dental milling machine is disclosed.

For example, Japanese Patent No. 5698096 discloses a method of fixing a mill blank to a dental milling machine by providing a recess around the entire outer edge and engaging the recess with a holding tool of the dental milling machine.

SUMMARY OF THE INVENTION

Technical Problem

However, when the mill blank disclosed in Japanese Patent No. 5698096 is fixed to a holding tool made of a metal member, there is a case that a portion of the mill blank is cracked or missing. Therefore, care must be taken when the mill blank is attached to and detached from the dental milling machine.

Furthermore, Japanese Unexamined Patent Application Publication No. 2018-50897 discloses a mill blank made of a ceramic material having disc shape in which a convex portion and a concave portion are provided on the periphery of a circular portion. However, even in this mill blank, because the strength of the mill blank is lower than that of the holding tool, cracks or chips occur in some parts of the mill blank in the case that the mill blank is attached to and detached from a dental milling machine, therefore it is difficult to use repeatedly.

Japanese Patent No. 6785753 discloses a mill blank in which a member made of plastic or the like is connected to the outer edge of a ceramic mill blank. By this configuration, it is possible to install a holding tool and the mill blank without directly engaging with each other, and therefore cracks and chips in the mill blank can be reduced even if the mill blank is repeatedly attached to and detached from a dental milling machine. However, when cutting and machining are performed on the portion including the vicinity of the outer edge of the mill blank, there is a problem in that the plastic member at the outer edge falls off, making it impossible to machining. Therefore, when machining the mill blank, it is necessary to avoid the vicinity of the outer edge, resulting in a large amount of wasted material.

Therefore, there has been a demand for a ceramic mill blank for dental cutting and machining in which cracks or chips are hardly caused on the outer edge of the ceramic mill blank even if attaching to and detaching from a dental milling machine are repeated and it is possible to machine the vicinity of the outer edge of the ceramic mill blank.

Solution to Problem

The present inventors have made intensive studies for a ceramic mill blank for dental cutting and machining in which cracks or chips are not caused on the outer edge of the ceramic mill blank by repeatedly attached to and detached from a dental milling machine and it is possible to machine the vicinity of the outer edge of the ceramic mill blank. As a result, it has been found that the above-mentioned problem can be improved by providing a seal member having a certain length or more to the outer edge of the ceramic mill blank. The details of the invention are described below.

That is, the present invention provides a ceramic mill blank for dental cutting and machining, wherein,
   the ceramic mill blank for dental cutting and machining comprises a ceramic portion to be cut and machined and one or more seal members,
   the ceramic portion consists of a ceramic material which is not finally sintered,
   the ceramic portion has an outer peripheral surface which is engageable with a holding tool,
   the one or more seal members are provided on the outer peripheral surface of the ceramic portion, and
   a length of the one or more seal members is 50% or more of a length in a circumferential direction of the outer peripheral surface provided with the one or more seal members.

Advantageous Effects of Invention

Because of providing 50% or more of a seal member with respect to a length of the outer peripheral portion of the ceramic portion, the present invention may provide a ceramic mill blank for dental cutting and machining in which cracks or chips are not caused on the outer edge of the ceramic mill blank even if attaching to and detaching from a dental milling machine are repeated and it is possible to machine the vicinity of the outer edge of the ceramic mill blank.

BRIEF DESCRIPTION OF DRAWINGS

FIG. 1 Perspective view of ceramic mill blank for dental cutting and machining according to the first embodiment.

FIG. 2 Plan view of ceramic mill blank for dental cutting and machining according to the first embodiment.

FIG. 3 Front elevational view of ceramic mill blank for dental cutting and machining according to the first embodiment.

FIG. 4 Rear view of ceramic mill blank for dental cutting and machining according to the first embodiment.

FIG. 5 Right side view of ceramic mill blank for dental cutting and machining according to the first embodiment.

FIG. 6 Perspective view of ceramic mill blank for dental cutting and machining according to the second embodiment.

FIG. 7 Plan view of ceramic mill blank for dental cutting and machining according to the second embodiment.

FIG. 8 Front elevational view of ceramic mill blank for dental cutting and machining according to the second embodiment.

FIG. 9 Rear view of ceramic mill blank for dental cutting and machining according to the second embodiment.

FIG. 10 Right side view of ceramic mill blank for dental cutting and machining according to the second embodiment.

FIG. 11 Perspective view of ceramic mill blank for dental cutting and machining according to the third embodiment.

FIG. 12 Plan view of ceramic mill blank for dental cutting and machining according to the third embodiment.

FIG. 13 Front elevational view of ceramic mill blank for dental cutting and machining according to the third embodiment.

FIG. 14 Rear view of ceramic mill blank for dental cutting and machining according to the third embodiment.

FIG. 15 Right side view of ceramic mill blank for dental cutting and machining according to the third embodiment.

FIG. 16 Perspective view of ceramic mill blank for dental cutting and machining according to the fourth embodiment.

FIG. 17 Plan view of ceramic mill blank for dental cutting and machining according to the fourth embodiment.

FIG. 18 Front elevational view of ceramic mill blank for dental cutting and machining according to the fourth embodiment.

FIG. 19 Rear view of ceramic mill blank for dental cutting and machining according to the fourth embodiment.

FIG. 20 Right side view of ceramic mill blank for dental cutting and machining according to the fourth embodiment.

FIG. 21 Perspective view of ceramic mill blank for dental cutting and machining according to the fifth embodiment.

FIG. 22 Plan view of ceramic mill blank for dental cutting and machining according to the fifth embodiment.

FIG. 23 Front elevational view of ceramic mill blank for dental cutting and machining according to the fifth embodiment.

FIG. 24 Rear view of ceramic mill blank for dental cutting and machining according to the fifth embodiment.

FIG. 25 Right side view of ceramic mill blank for dental cutting and machining according to the fifth embodiment.

FIG. 26 Perspective view of ceramic mill blank for dental cutting and machining according to the sixth embodiment.

FIG. 27 Plan view of ceramic mill blank for dental cutting and machining according to the sixth embodiment.

FIG. 28 Front elevational view of ceramic mill blank for dental cutting and machining according to the sixth embodiment.

FIG. 29 Rear view of ceramic mill blank for dental cutting and machining according to the sixth embodiment.

FIG. 30 Right side view of ceramic mill blank for dental cutting and machining according to the sixth embodiment.

FIG. 31 Perspective view of ceramic mill blank for dental cutting and machining according to the seventh embodiment.

FIG. 32 Plan view of ceramic mill blank for dental cutting and machining according to the seventh embodiment.

FIG. 33 Front elevational view of ceramic mill blank for dental cutting and machining according to the seventh embodiment.

FIG. 34 Rear view of ceramic mill blank for dental cutting and machining according to the seventh embodiment.

FIG. 35 Right side view of ceramic mill blank for dental cutting and machining according to the seventh embodiment.

FIG. 36 Perspective view of ceramic mill blank for dental cutting and machining according to the eighth embodiment.

FIG. 37 Plan view of ceramic mill blank for dental cutting and machining according to the eighth embodiment.

FIG. 38 Front elevational view of ceramic mill blank for dental cutting and machining according to the eighth embodiment.

FIG. 39 Rear view of ceramic mill blank for dental cutting and machining according to the eighth embodiment.

FIG. 40 Right side view of ceramic mill blank for dental cutting and machining according to the eighth embodiment.

FIG. 41 Perspective view of ceramic mill blank for dental cutting and machining according to the ninth embodiment.

FIG. 42 Plan view of ceramic mill blank for dental cutting and machining according to the ninth embodiment.

FIG. 43 Front elevational view of ceramic mill blank for dental cutting and machining according to the ninth embodiment.

FIG. 44 Rear view of ceramic mill blank for dental cutting and machining according to the ninth embodiment.

FIG. 45 Right side view of ceramic mill blank for dental cutting and machining according to the ninth embodiment.

FIG. 46 Perspective view of ceramic mill blank for dental cutting and machining according to the tenth embodiment.

FIG. 47 Plan view of ceramic mill blank for dental cutting and machining according to the tenth embodiment.

FIG. 48 Front elevational view of ceramic mill blank for dental cutting and machining according to the tenth embodiment.

FIG. 49 Rear view of ceramic mill blank for dental cutting and machining according to the tenth embodiment.

FIG. 50 Right side view of ceramic mill blank for dental cutting and machining according to the tenth embodiment.

FIG. 51 Perspective view of ceramic mill blank for dental cutting and machining according to the eleventh embodiment.

FIG. 52 Plan view of ceramic mill blank for dental cutting and machining according to the eleventh embodiment.

FIG. 53 Front elevational view of ceramic mill blank for dental cutting and machining according to the eleventh embodiment.

FIG. 54 Rear view of ceramic mill blank for dental cutting and machining according to the eleventh embodiment.

FIG. 55 Right side view of ceramic mill blank for dental cutting and machining according to the eleventh embodiment.

FIG. 56 Perspective view of ceramic mill blank for dental cutting and machining according to the twelfth embodiment.

FIG. 57 Plan view of ceramic mill blank for dental cutting and machining according to the twelfth embodiment.

FIG. 58 Front elevational view of ceramic mill blank for dental cutting and machining according to the twelfth embodiment.

FIG. 59 Rear view of ceramic mill blank for dental cutting and machining according to the twelfth embodiment.

FIG. 60 Right side view of ceramic mill blank for dental cutting and machining according to the twelfth embodiment.

FIG. 61 Perspective view of ceramic mill blank for dental cutting and machining according to the thirteenth embodiment.

FIG. 62 Plan view of ceramic mill blank for dental cutting and machining according to the thirteenth embodiment.

FIG. 63 Front elevational view of ceramic mill blank for dental cutting and machining according to the thirteenth embodiment.

FIG. 64 Rear view of ceramic mill blank for dental cutting and machining according to the thirteenth embodiment.

FIG. 65 Right side view of ceramic mill blank for dental cutting and machining according to the thirteenth embodiment.

FIG. 66 Perspective view of ceramic mill blank for dental cutting and machining according to the fourteenth embodiment.

FIG. 67 Plan view of ceramic mill blank for dental cutting and machining according to the fourteenth embodiment.

FIG. 68 Front elevational view of ceramic mill blank for dental cutting and machining according to the fourteenth embodiment.

FIG. 69 Rear view of ceramic mill blank for dental cutting and machining according to the fourteenth embodiment.

FIG. 70 Right side view of ceramic mill blank for dental cutting and machining according to the fourteenth embodiment.

FIG. 71 Perspective view of ceramic mill blank for dental cutting and machining according to the fifteenth embodiment.

FIG. 72 Plan view of ceramic mill blank for dental cutting and machining according to the fifteenth embodiment.

FIG. 73 Front elevational view of ceramic mill blank for dental cutting and machining according to the fifteenth embodiment.

FIG. 74 Rear view of ceramic mill blank for dental cutting and machining according to the fifteenth embodiment.

FIG. 75 Right side view of ceramic mill blank for dental cutting and machining according to the fifteenth embodiment.

FIG. 76 First schematic diagram of seal member performed with an embrittlement treatment.

FIG. 77 Second schematic diagram of seal member performed with an embrittlement treatment.

FIG. 78 Third schematic diagram of seal member performed with an embrittlement treatment.

FIG. 79 Fourth schematic diagram of seal member performed with an embrittlement treatment.

FIG. 80 Fifth schematic diagram of seal member performed with an embrittlement treatment.

FIG. 81 Sixth schematic diagram of seal member performed with an embrittlement treatment.

FIG. 82 Perspective view of ceramic mill blank for dental cutting and machining according to the sixteenth embodiment.

FIG. 83 Plan view of ceramic mill blank for dental cutting and machining according to the sixteenth embodiment.

FIG. 84 Front elevational view of ceramic mill blank for dental cutting and machining according to the sixteenth embodiment.

FIG. 85 Rear view of ceramic mill blank for dental cutting and machining according to the sixteenth embodiment.

FIG. 86 Right side view of ceramic mill blank for dental cutting and machining according to the sixteenth embodiment.

FIG. 87 Perspective view of ceramic mill blank for dental cutting and machining according to the seventeenth embodiment.

FIG. 88 Plan view of ceramic mill blank for dental cutting and machining according to the seventeenth embodiment.

FIG. 89 Front elevational view of ceramic mill blank for dental cutting and machining according to the seventeenth embodiment.

FIG. 90 Rear view of ceramic mill blank for dental cutting and machining according to the seventeenth embodiment.

FIG. 91 Right side view of ceramic mill blank for dental cutting and machining according to the seventeenth embodiment.

DETAILED DESCRIPTION OF THE PREFERRED EMBODIMENTS

In the present invention, the ceramic portion may include a convex portion which is engageable with a holding tool on outer peripheral surface, the one or more seal members may be provided on the outer peripheral surface of the convex portion, and a length of the one or more seal members may be 50% or more of a length in a circumferential direction of the outer peripheral surface provided with the one or more seal members.

In the present invention, a width of the one or more seal members may be 50% or more of a dimension of the outer peripheral surface of the convex portion in a thickness direction of the ceramic portion.

In the present invention, a total length of the one or more seal members may be 75% or more of a length in the circumferential direction of the outer peripheral surface provided with the one or more seal members.

In the present invention, a total length of the one or more seal members may be 100% or more of a length in the circumferential direction of the outer peripheral surface provided with the one or more seal members.

In the present invention, a total length of the one or more seal members may be within a range of 96% to 104% of a length in the circumferential direction of the outer peripheral surface provided with the one or more seal members.

In the present invention, the one or more seal members may be formed with one or more slits.

In the present invention, the one or more slits may be formed to be inclined with respect to a thickness direction of the outer peripheral surface of the convex portion.

In the present invention, the one or more seal members may be colored in a color after final sintering of the ceramic portion.

In the present invention, the one or more seal members may be printed with character information.

In the present invention, the one or more seal members may be performed with a treatment for separating an area where character information is printed and an area where character information is not printed.

In the present invention, the dimension of the convex portion of the ceramic portion in a thickness direction of the ceramic portion may be within a range of 5 to 30 mm.

In the present invention, the ceramic mill blank for dental cutting and machining may comprise two or more seal members.

In the present invention, the two or more seal members may have difference length each other.

In the present invention, the one or more seal members may be detachable from the ceramic portion.

In the present invention, the ceramic portion may have Vickers hardness within a range of 30 to 80 Hv0.2 measured according to JIS Z 2244:2009.

In the present invention, a ratio of diameter to thickness in the ceramic portion may be within a range of 10:1 to 2:1.

In the present invention, the one or more seal members may have a seal strength within a range of 1 to 50 N/9 mm in the case that the one or more seal members having a width of 9 mm are peeled off from the outer peripheral surface of the ceramic portion at a speed of 1 cm/sec.

In the present invention, the one or more seal members may be performed with an embrittlement treatment.

The present invention will be explained in detail below. In the following description, drawings and reference symbols are added for the purpose of understanding the invention, and are not intended to limit the invention to the illustrated embodiments.

The dental milling machine in the present invention particularly refers to a device that cuts and machines a dental prosthetic device from a mill blank under program control.

The grinding member in the present invention particularly means a dental grinding instrument used in a dental milling machine. For example, the working surface of a dental grinding instrument may include abrasive particles, such as diamond, having a particular particle size, thereby forming an undefined blade.

The present invention may provide a ceramic mill blank for dental cutting and machining in which cracks or chips on the outer edge of the ceramic mill blank are prevented even if attaching to and detaching from a dental milling machine are repeated and it is possible to machine the vicinity of the outer edge of the ceramic mill blank.

The present invention also provides a set of ceramic mill blank for dental cutting and machining comprising two or more ceramic mill blanks for dental cutting and machining in the case of that the one or more seal members are colored in a color after final sintering of the ceramic portion.

FIG. 1 shows a perspective view, FIG. 2 shows a plan view, FIG. 3 shows a front elevational view, FIG. 4 shows a rear view and FIG. 5 shows a right side view of a ceramic mill blank for dental cutting and machining according to the first embodiment of the present invention. In the present embodiment, a left side view is not illustrated because it is symmetrical to the right side view. In FIGS. 1 to 5, although the seal member 20 is shown by the color which is different from that of the ceramic portion 10 in order to easily understand, the color of the seal member 20 is not limited to that shown in FIGS. 1 to 5 and may be the same color as the color of the ceramic portion 10. The ceramic mill blank for dental cutting and machining 1 according to the present embodiment includes a ceramic portion 10 to be cut and machined and one or more seal members 20. The ceramic portion 10 may be constituted, for example, of a ceramic material which is not finally sintered.

As shown in FIG. 1, the ceramic portion 10 of the present embodiment has a so-called disk shape. An outer peripheral surface 11 thereof is provided with a convex portion 12 which is engageable with a holding tool and the one or more seal members 20 are provided on an outer peripheral surface 12a of the convex portion 12. The total length of the one or more seal members 20 is 50% or more of a length in a circumferential direction of the outer peripheral surface 12a of the convex portion 12 of the ceramic portion 10. The length in a circumferential direction of the outer peripheral surface 12a of the convex portion 12 means the length in the direction perpendicular to the thickness direction of the ceramic portion 10. In the present embodiment, one seal member 20 is provided on 50% or more of a length in a circumferential direction of the outer peripheral surface provided with the seal member 20, that is, on 50% or more of a length in a circumferential direction of the outer peripheral surface 12a of the convex portion 12.

The ceramic mill blank for dental cutting and machining of the present invention is attached so that a peripheral edge of the ceramic portion is surrounded by a holding tool of a dental milling machine. In the present specification, the term "peripheral edge is surrounded" particularly means that a peripheral edge of the ceramic portion is surrounded along an entire periphery or a part of the periphery, and means a state in which the ceramic portion is held by the holding tool of the dental milling machine. The holding tool holds the ceramic mill blank for dental cutting and machining substantially over the entire periphery thereby suppressing dropout from the holding tool. This holding tool may have a cylindrical shape for holding the outer peripheral surface of a ceramic mill blank for dental cutting and machining, for example, and hold the convex portion between two cylinders. Alternatively, a groove capable of holding the convex portion may be formed in a semi-cylindrical member, and the convex portion may be held between two semi-cylindrical members to hold.

The ceramic mill blank for dental cutting and machining according to the present invention can be repeatedly attached to and detached from a holding tool of a dental milling machine, and is preferably fixed by pressure fitting and/or form locking.

The shape of the ceramic portion in the present invention is not limited to a disk shape, and may be a planar shape such as a non-circular shape such as an outline based on the shape of the human upper jaw, an elliptical shape and a polygon.

In the case of a disk shape, a ratio of diameter to thickness in the ceramic portion may be within a range, for example, of 20:1 to 2:1, 10:1 to 2:1, 9:1 to 2:1. The diameter of the ceramic portion may, for example, exceed 40 mm, exceed 90 mm and be less than 200 mm, in particular be 95 mm to 110 mm, and more preferably be within a range of 95 to 100 mm. In addition, the height of the ceramic portion may be within a range of 10 to 35 mm. Specifically, the ceramic portion has the diameter of 95 mm and the height of 12 mm or the diameter of 98 mm and the height of 12 mm.

Although the outer peripheral surface 11 of the ceramic portion 10 of the present embodiment is formed with the convex portion 12 which is engageable with a holding tool of a dental milling machine, it is possible that a holding tool of a milling machine is directly engageable with the ceramic portion 10 without forming a convex portion 12. In this case, for example, the outer peripheral surface 11 may be engaged with a holding tool, and the length of the one or more seal members 20 is 50% or more of a length in the circumferential direction of the outer peripheral surface 11 provided with the seal member 20. The convex portion 12 may be continuous over the entire circumference of the outer peripheral surface 11 of the ceramic portion 10. It is particularly advantageous to provide the convex portion 12, because it is surrounded by the holding tool of the dental milling machine, and consequently increases holding force to secure the ceramic portion 10 to the dental milling machine against the forces applied during cutting and machining.

In the present invention, the ceramic portion 10 is not only directly installed on the holding tool of the dental milling machine via the convex portion 12, for example, but also indirectly fixed via an adapter that can have an annular shape, for example and be installed to a dental milling machine.

The width of the convex portion 12 of the ceramic portion 10 in the present invention may be set arbitrarily but from the viewpoint of the allowable holding range attached to the holding tool of the dental milling machine, it may be 5 mm or more and 30 mm or less. The width of the convex portion 12 of the ceramic portion 10 in the present invention is preferably 5 mm or more and 20 mm or less, more preferably 8 mm or more and 12 mm or less, and especially preferably 10 mm.

The height of the convex portion 12 of the ceramic portion 10 in the present invention may be set arbitrarily but from the viewpoint of the allowable holding range attached to the holding tool of the dental milling machine, it may be 0.5 to 10%, 1 to 5% and 1 to 3% with respect to the diameter of the ceramic portion 10.

The ceramic portion in the present invention may be, for example, in a pre-sintered state (pre-sintered body) of a molded body prepared by molding ceramic powder. After installing in a dental milling machine, an arbitrary prosthetic device is cut and machined from a pre-sintered body, and a perfect sintered body is prepared by perfect sintering so that it can be used in the oral cavity. Therefore, the density of the perfect sintered body is higher than that of the pre-sintered body. The pre-sintered body includes pores and therefore is a porous body. The value calculated by apparent volume and mass of the pre-sintered body is called as pre-sintering density. Perfect-sintering density is calculated by the dimensional measurement and the mass measurement of the perfect sintered body. The relative density is calculated by following formula.

Relative density (%)={(Pre-sintering density)/(Perfect-sintering density)}×100

When the ceramic portion in the present invention is a pre-sintered body which is not finally sintered, the relative density may be 30% to 70%, 35% to 65% and 40% to 60% in order to cut with a dental milling machine.

The type of the ceramic portion in the present invention is not particularly limited, and may be zirconia, alumina, lithium disilicate, lithium metasilicate and the like, and may be zirconia.

The ceramic portion in the present invention may be, for example, a zirconia fired to a state that the zirconia crystal particles are not perfect sintered. This zirconia not perfect sintered is also referred to as a zirconia temporarily sintered body. The zirconia temporarily sintered body may contain zirconia and a stabilizer that suppresses the phase transition of the crystal phase of zirconia. Examples of stabilizers include oxides such as calcium oxide (CaO), magnesium oxide (MgO), yttrium oxide ($Y_2O_3$) and cerium oxide ($CeO_2$). The stabilizer may be added in an amount such that the tetragonal zirconia particles can be partially stabilized. For example, when yttria is used as a stabilizer, the content of yttria may be 1.5 mol % to 8 mol %, 2 mol % to 6.5 mol % relative to the total of moles of zirconia and yttria. If the content of the stabilizer is too high, the flexural strength and fracture toughness is lowered. On the other hand, if the content of the stabilizer is too low, suppression of the progress of phase transition is insufficient. The content of the stabilizer in zirconia may be measured by, for example, inductively coupled plasma emission spectrometry, fluorescent X-ray analysis, and the like.

In the present invention, the zirconia particles or powders containing the stabilizer are prepared by a suitable method such as a hydrolysis method, a neutralization coprecipitation method, an alkoxide method, or a solid phase method. Further, if need, it is possible to be added with elements or pigments which exhibit color.

The ceramic portion in the present invention may have Vickers hardness of 30 to 150 Hv0.2, 40 to 100 Hv0.2 and 50 to 80 Hv0.2 measured according to JIS Z 2244:2009. The Vickers hardness of the present invention is measured by the Vickers hardness test of JIS Z 2244: 2009 (Vickers hardness test-Test method). For example, a specimen is prepared from a mill blank by using a milling machine (DWX-52DCi, manufactured by Roland DG Corporation), and a surface of the prepared specimen is polished with a waterproof polishing paper (#2000) and the Vickers hardness of the polished surface is measured by using a Vickers hardness tester (micro Vickers hardness tester, manufactured by Mitutoyo) (load: 200 g, load time: 10 seconds). Vickers hardness (Hv0.2) is average of the measured values at 5 points.

The method for preparing the ceramic portion in the present invention is not particularly limited, but it may be prepared by press molding a zirconia powder containing a stabilizer. For example, it may be press molded into a disk shape. As the pressure molding method, a suitable method can be selected as appropriate, and the press pressure may be, for example, 10 MPa or more in terms of surface pressure.

In the present invention, CIP (cold isostatic pressing) molding can be further performed after the press molding. In this CIP molding, for example, a pressure of 100 MPa or more may be subjected.

In the present invention, after the CIP molding, for example, a firing is performed at a temperature at which zirconia particles are not sintered to obtain a temporary sintered body. As the temporary sintering conditions, for example, a temporary sintering temperature is 800° C. to 1200° C. and a holding time is 0 hour to 36 hours.

In the present invention, the shape of the convex portion 12 which is engageable with the holding tool of the dental milling machine may be formed, for example, by a mold in press molding, or by cutting the outer edge by using an NC lathe and the like.

The type of the seal member in the present invention is not particularly limited, and it may have a structure capable of adhering to the ceramic portion as long as it is provided with an adhesive material on at least one side.

FIG. 6 shows a perspective view, FIG. 7 shows a plan view, FIG. 8 shows a front elevational view, FIG. 9 shows a rear view and FIG. 10 shows a right side view of a ceramic mill blank for dental cutting and machining according to the second embodiment of the present invention. A left side view is not illustrated because it is symmetrical to the right side view. In FIGS. 6 to 10, although the seal member 20 is shown by the color which is different from that of the ceramic portion 10 in order to easily understand, the color of the seal member 20 is not limited to that shown in FIGS. 6 to 10 and may be the same color as the color of the ceramic portion 10. As shown in FIGS. 6 to 10, the total length of the one or more seal members 20 may be 75% or more of a length in a circumferential direction of the outer peripheral surface provided with the seal member 20, that is, 75% or more of a length in a circumferential direction of the outer peripheral surface 12a of the convex portion 12 of the ceramic portion 10.

FIG. 11 shows a perspective view, FIG. 12 shows a plan view, FIG. 13 shows a front elevational view, FIG. 14 shows a rear view and FIG. 15 shows a right side view of a ceramic mill blank for dental cutting and machining according to the third embodiment of the present invention. A left side view is not illustrated because it is symmetrical to the right side view. In FIGS. 11 to 15, although the seal member 20 is shown by the color which is different from that of the ceramic portion 10 in order to easily understand, the color of the seal member 20 is not limited to that shown in FIGS. 11 to 15 and may be the same color as the color of the ceramic portion 10. In the third embodiment, the one or more seal members 20 are provided so that both ends in the circumferential direction of the outer peripheral surface 12a of the convex portion 12 of the ceramic portion 10 are slightly spaced apart. As the present embodiment, the total length of the one or more seal members 20 may be substantially 100% of the length in the circumferential direction of the outer peripheral surface provided with the seal member 20, that is, the length in the circumferential direction of the outer peripheral surface 12a of the convex portion 12 of the ceramic portion 10, and may be 96 to 99%. By providing such a gap, it is possible to easily attach and detach the seal member while suppressing cracks and chippings in the outer edge of the mill blank over the entire circumference of the ceramic mill blank for dental cutting and machining. In this case, damage to the seal member can be suppressed by not providing angular portions at both ends of the seal member.

FIG. 16 shows a perspective view, FIG. 17 shows a plan view, FIG. 18 shows a front elevational view, FIG. 19 shows a rear view and FIG. 20 shows a right side view of a ceramic mill blank for dental cutting and machining according to the fourth embodiment of the present invention. A left side view is not illustrated because it is symmetrical to the right side view. In FIGS. 16 to 20, although the seal member 20 is shown by the color which is different from that of the ceramic portion 10 in order to easily understand, the color of the seal member 20 is not limited to that shown in FIGS. 16 to 20 and may be the same color as the color of the ceramic portion 10. In the fourth embodiment, the one or more seal members 20 are provided so that both ends in the circumferential direction of the outer peripheral surface 12a of the convex portion 12 of the ceramic portion 10 are slightly overlap. As the present embodiment, the total length of the one or more seal members 20 may be substantially 100% or more of the length in the circumferential direction of the outer peripheral surface provided with the seal member 20, that is, the length in the circumferential direction of the outer peripheral surface 12a of the convex portion 12 of the ceramic portion 10, and may be 101 to 104%. By adopting such an overlapping structure, it is possible to easily attach and detach the seal member while suppressing cracks and chippings in the outer edge of the mill blank over the entire circumference of the ceramic mill blank for dental cutting and machining.

In light of the third and fourth embodiments, in the present invention, the total length of the one or more seal members may be within a range of 96% to 104% of the length in the circumferential direction of the outer peripheral surface provided with the seal member 20, that is, the length in the circumferential direction of the convex portion.

In the above described first to fourth embodiments, the one or more seal members are formed over the entire convex portion in the thickness direction of the ceramic portion. However, the one or more seal members may be formed over 50% or more of the outer peripheral surface of the convex portion in the thickness direction of the ceramic portion, and may be formed over 75% or more. In addition, in the case that a convex portion is not formed on the outer peripheral surface of the ceramic portion, the one or more seal members may be formed over 50% or more of the outer peripheral surface of the ceramic portion in the thickness direction of the ceramic portion, may be formed over 75% or more and may be formed over the entire.

FIG. 21 shows a perspective view, FIG. 22 shows a plan view, FIG. 23 shows a front elevational view, FIG. 24 shows a rear view and FIG. 25 shows a right side view of a ceramic mill blank for dental cutting and machining according to the fifth embodiment of the present invention. FIG. 26 shows a perspective view, FIG. 27 shows a plan view, FIG. 28 shows a front elevational view, FIG. 29 shows a rear view and FIG. 30 shows a right side view of a ceramic mill blank for dental cutting and machining according to the sixth embodiment of the present invention. FIG. 31 shows a perspective view, FIG. 32 shows a plan view, FIG. 33 shows a front elevational view, FIG. 34 shows a rear view and FIG. 35 shows a right side view of a ceramic mill blank for dental cutting and machining according to the seventh embodiment of the present invention. FIG. 36 shows a perspective view, FIG. 37 shows a plan view, FIG. 38 shows a front elevational view, FIG. 39 shows a rear view and FIG. 40 shows a right side view of a ceramic mill blank for dental cutting and machining according to the eighth embodiment of the present invention. In these embodiments, the one or more seal members are formed over 95% or more, that is, 75% or more of the outer peripheral surface provided with the seal member, that is, the outer peripheral surface of the convex portion in the thickness direction of the ceramic portion.

FIG. 41 shows a perspective view, FIG. 42 shows a plan view, FIG. 43 shows a front elevational view, FIG. 44 shows a rear view and FIG. 45 shows a right side view of a ceramic mill blank for dental cutting and machining according to the ninth embodiment of the present invention. FIG. 46 shows a perspective view, FIG. 47 shows a plan view, FIG. 48 shows a front elevational view, FIG. 49 shows a rear view and FIG. 50 shows a right side view of a ceramic mill blank for dental cutting and machining according to the tenth embodiment of the present invention. FIG. 51 shows a perspective view, FIG. 52 shows a plan view, FIG. 53 shows a front elevational view, FIG. 54 shows a rear view and FIG. 55 shows a right side view of a ceramic mill blank for dental cutting and machining according to the eleventh embodiment of the present invention. FIG. 56 shows a perspective view, FIG. 57 shows a plan view, FIG. 58 shows a front elevational view, FIG. 59 shows a rear view and FIG. 60 shows a right side view of a ceramic mill blank for dental cutting and machining according to the twelfth embodiment of the present invention. In these embodiments, the one or more seal members are formed over 50% of the outer peripheral surface provided with the seal member, that is, the outer peripheral surface of the convex portion in the thickness direction of the ceramic portion.

In the case of a disk shape (disk), a ratio of diameter to thickness in the ceramic portion may be within a range, for example, of 20:1 to 2:1, 10:1 to 2:1 and 9:1 to 2:1. The diameter of the ceramic portion may, for example, exceed 40 mm, exceed 90 mm and be less than 200 mm, in particular be 95 mm to 110 mm, and more preferably be within a range of 95 to 100 mm. In addition, the height of the ceramic portion can be within a range of 10 to 35 mm. Specifically, the ceramic portion has the diameter of 95 mm and the height of 12 mm or the diameter of 98 mm and the height of 12 mm.

FIG. 61 shows a perspective view, FIG. 62 shows a plan view, FIG. 63 shows a front elevational view, FIG. 64 shows a rear view and FIG. 65 shows a right side view of a ceramic mill blank for dental cutting and machining according to the thirteenth embodiment of the present invention. FIG. 66 shows a perspective view, FIG. 67 shows a plan view, FIG. 68 shows a front elevational view, FIG. 69 shows a rear view and FIG. 70 shows a right side view of a ceramic mill blank for dental cutting and machining according to the fourteenth embodiment of the present invention. FIG. 71 shows a perspective view, FIG. 72 shows a plan view, FIG. 73 shows a front elevational view, FIG. 74 shows a rear view and FIG. 75 shows a right side view of a ceramic mill blank for dental cutting and machining according to the fifteenth embodiment of the present invention. The number of seal members in the present invention may be one, or two or more. When two or more seal members are used, the seal members may be arranged one on top of the other, or a plurality of seal members may be arranged discontinuously at intervals. In this case, a slit is formed between two or more seal members over the entire thickness of the ceramic portion. The lengths of two or more seal members may be different from each other or may be the same. Further, the slit may be formed to be inclined with respect to the thickness direction of the outer peripheral surface provided with the seal member, for example, the outer peripheral surface of the convex portion.

The seal member in the present invention may have a detachable mechanism from the ceramic portion depending on the purpose. For example, in the case of cutting and machining the surface of the convex portion of the ceramic portion, by removing the seal member in advance before cutting and machining, it is possible to prevent the seal member from being caught in the cutting member.

As the length of the ceramic portion in a circumferential direction of the outer peripheral surface, for example, in the case of a disc shape mill blank including a convex portion with a diameter of 98 mm, the length of the total outer peripheral is about 307.7 mm and 50% or more of the length of the total outer peripheral is about 153.9 mm or more.

There is a commercially available ceramic mill blank for dental cutting and machining provided with a seal member for the purpose of recognizing, for example, a lot number, a color tone (shade), a shrinkage rate (a magnification rate, a processing factor) and the like. However, the seal member does not exceed 50% of the total length of the outer peripheral, and does not have an effect of suppressing cracks at the outer edge of the mill blank when it is repeatedly attached to and detached from the dental milling machine.

In the seal member of the present invention, information can be provided in the form of characters, symbols such as bar codes and the like by printing, engraving, and the like. The information can include, for example, the lot number, the color tone (shade), the shrinkage rate (the magnification rate, the processing factor), the distinction between top and bottom, and the like. In this case, it is preferable that a treatment for separating an area where character information is printed and an area where character information is not printed is performed. By performing such a treatment, it becomes easy to reattach only the area where the character information is printed, and it is possible to suppress the inability to distinguish the ceramic mill blank for dental cutting and machining.

In the seal member of the present invention, a seal strength in the case that the seal member having a width of 9 mm is peeled off from an outer peripheral surface of the ceramic portion at a speed of 1 cm/sec may be within a range of 1 to 50 N/9 mm, 1 to 10 N/9 mm, 5 to 40 N/9 mm and 10 to 30 N/9 mm. When the seal strength is less than 1 N/9 mm, because the adhesive strength is insufficient and there is a possibility of peeling off in attaching and detaching the disc, and therefore there is a case where a problem that it is impossible to use repeatedly is caused. When the seal strength exceeds 50 N/9 mm, there is a case where a problem that it becomes difficult to remove the seal member when it is necessary to optionally remove the seal member before cutting and machining is caused. Further, the seal member may be colored in a color after final sintering of the ceramic portion. Only a portion of the seal member may be colored, and a treatment for separating a colored area and a non-colored area may be performed. Furthermore, in the case that the seal member is colored in a color after final sintering of the ceramic portion, a set of ceramic mill blank for dental cutting and machining comprising a combination of two or more ceramic mill blanks for dental cutting and machining may be prepared.

The seal member in the present invention may be performed with an embrittlement treatment as shown in FIGS. 76 to 81. By performing such a treatment, it is possible to improve the attaching/detaching property. Such slits, for example, of 0.3 to 2.0 mm can be formed over the entire circumference at intervals of 1 cm.

FIGS. 82 to 91 show examples in which only the main parts of the ceramic mill blank for dental cutting and machining of the present invention are shown in solid lines. For example, when comparing FIGS. 82 to 86 and FIGS. 11 to 15, FIGS. 82 to 86 are different from FIGS. 11 to 15 in that the part where the convex portion is not formed on the outer peripheral surface of the ceramic portion is indicated by a broken line. Similarly, when comparing FIGS. 87 to 91 and FIGS. 16 to 20, FIGS. 87 to 91 are different from FIGS. 16 to 20 in that the part where the convex portion is not formed on the outer peripheral surface of the ceramic portion is indicated by a broken line. In this way, in the present invention, the height of the ceramic portion may be, for example, 10-35 mm, and as is clear from this, the height of the ceramic portion can be changed as appropriate depending on, for example, the form of the tooth to be prepared, and does not constitute the main part of the design. Therefore, in FIGS. 1 to 10 and FIGS. 21 to 75, the portion of the outer peripheral surface of the ceramic portion where the convex portion is not formed may be indicated by a broken line for design patent. That is, the present specification discloses FIGS. 1 to 10 and FIGS. 21 to 75 in which a portion of the outer peripheral surface of the ceramic portion in which the convex portion is not formed is indicated by a broken line.

EXAMPLES

Hereinafter, the present invention is described by way of Examples in more detail, and specifically but the present invention is not limited to these Examples.

[Preparation of Ceramic Mill Blank for Dental Cutting and Machining]

Zirconia powder containing 5 mol % of yttrium as a stabilizer was filled in a mold (φ100 mm), and pressure molded (surface pressure: 30 MPa). Next, CIP molding (maximum pressure: 200 MPa, holding time: 1 minute) was performed on the press-molded body by using a CIP molding machine. Thereafter, it was calcined in an electric furnace at a temperature that did not reach perfect sintering (1000° C., 30 minutes) to prepare a disk-shaped calcined body with a diameter of 98 mm and a thickness of 14 mm. In order to provide a convex portion that could be engaged with a dental milling machine, the outer edges of both surfaces of the calcined body were machined to a thickness of 2 mm in the thickness direction and 1 mm in the diameter direction over the entire circumference using an NC lathe. In the prepared convex portion of the ceramic mill blank, the width of convex portion was 10 mm, the height of the convex portion was 1 mm, and the total length of the convex portion outer circumference was 307.7 mm. A seal member as shown in Table 1 was provided in the convex portion of the prepared ceramic mill blank for dental cutting and machining. As the seal member provided on the convex portion, "PRO Tape Cartridge" (manufactured by King Jim Co., Ltd.) was used. The seal members with widths of 6 mm and 9 mm were used.

[Evaluation of Attaching/Detaching Property]

In order to evaluate the attaching/detaching property, by using a dental cutting and machining machine "DWX-51D", a convex portion of a ceramic mill blank for dental cutting and machining was engaged with a holding tool made of a metal member of a dental milling machine, and a torque wrench (30 cN·m) was fixed by pressure fitting. Thereafter, cutting and machining were performed using a dental CAD/CAM system based on design data in which a molar crown model was placed within 1 mm from the outer edge of the ceramic mill blank. This operation was repeated four times, and if the size of damage caused on the convex portion of the ceramic mill blank for dental cutting and machining is 3 cm$^2$ or more, it was evaluated as "B", and if the size of damage caused on the convex portion of the ceramic mill blank for dental cutting and machining is less than 3 cm$^2$, it was evaluated as "A".

Comparative Examples 2 and 4

Comparative Examples 2 and 4 were commercially available dental ceramics for cutting and machining "SHOFU DISC ZR Lucent Supra" (manufactured by SHOFU.INC). Since the length of the seal member in the ceramic mill blank was less than 50% of the total length of the outer circumference of the convex portion, cracks and chips were observed during attachment and detachment.

Next, the relationship between the durability of the seal member and the seal strength in the case of that the seal member is used repeatedly was evaluated. As the seal strength of each seal member, a seal member with a width of 9 mm was attached along the outer peripheral surface of the ceramic portion, and the force required to peel off the attached seal member at a speed of 1 cm/sec was measured. The direction in which the seal member was peeled off was the tangential direction of the outer peripheral surface of the ceramic portion. Table 2 shows the seal strength of the seal members used for evaluation.

TABLE 1

|  | Example 1 | Example 2 | Example 3 | Comparative Example 1 | Comparative Example 2 |
|---|---|---|---|---|---|
| Total length of convex part (mm) | 307.7 | 307.7 | 307.7 | 307.7 | 309.3 |
| Seal member length (mm) | 155 | 307 | 100 | 100 | 90 |
| Number of seal members (mm) | 1 | 1 | 3 | 1 | 1 |
| Length of sealing member relative to the total length of the outer circumference of the convex portion (%) | 50 | 100 | 98 | 32 | 29 |
| Seal member width (mm) | 6 mm | 6 mm | 6 mm | 6 mm | 6 mm |
| Attaching/detaching property | A | A | A | B | B |

|  | Example 4 | Example 5 | Example 6 | Comparative Example 3 | Comparative Example 4 |
|---|---|---|---|---|---|
| Total length of convex part (mm) | 307.7 | 307.7 | 307.7 | 307.7 | 309.3 |
| Seal member length (mm) | 155 | 307 | 100 | 100 | 90 |
| Number of seal members (mm) | 1 | 1 | 3 | 1 | 1 |
| Length of sealing member relative to the total length of the outer circumference of the convex portion (%) | 50 | 100 | 98 | 32 | 29 |
| Seal member width (mm) | 9 mm | 9 mm | 9 mm | 9 mm | 9 mm |
| Attaching/detaching property | A | A | A | B | B |

Examples 1 to 6

In the Examples 1 to 6, the length of the seal member with respect to the total outer circumference length of the convex portion of the ceramic mill blank for dental cutting and machining is within a range of 50 to 100%. As for the attaching/detaching property of the ceramic mill blank of Examples 1 to 6, no damage having 3 cm$^2$ or more was observed during attachment/detachment, even when machining was performed near the outer edge portion.

Comparative Examples 1 and 3

In Comparative Examples 1 and 3, a seal member (length: 100 mm, width: 9 mm, number of sheal: 1) was provided to ceramic mill blank for dental cutting and machining 1. Since the length of the seal member in the ceramic mill blank was less than 50% of the total length of the outer circumference of the convex portion, cracks and chips were observed during attachment and detachment.

TABLE 2

| Seal member 1 | 7.2N/9 mm |
|---|---|
| Seal member 2 | 0.2N/9 mm |
| Seal member 3 | 6.8N/9 mm |
| Seal member 4 | 4.4N/9 mm |
| Seal member 5 | 63.5N/9 mm |

Seal members 1 to 5 shown in Table 2 were attached to and removed from the dental milling machine four times, and it was confirmed whether or not the seal members peeled off when attached to and removed from the dental milling machine. Furthermore, the seal member was removed twice, and the ease of peeling the seal member was evaluated. The ease of peeling the seal member was evaluated by five evaluators.

In the seal members 1, 3, and 4, no peeling of the seal member occurred, and none of the five evaluators felt the seal member difficult to peel, and rated as good peel ability.

In the seal member 2, peel ability was good but, peeling of the seal member occurred.

In the seal member 5, although no peeling of the seal member occurred, all five evaluators felt that the seal member was difficult to peel off.

With respect to the use of substantially any plural and/or singular terms herein, those having skill in the art can translate from the plural to the singular and/or from the singular to the plural as is appropriate to the context.

Although the description herein has been given with reference to the drawings and embodiments, it should be noted that those skilled in the art may make various changes and modifications on the basis of this invention without difficulty. Accordingly any such changes and modifications are intended to be included in the scope of the embodiments.

INDUSTRIAL APPLICABILITY

The present invention may provide a ceramic mill blank for dental cutting and machining in which cracks or chips are not caused on the outer edge of the ceramic mill blank even if attaching to and detaching from a dental milling machine are repeated and it is possible to machine the vicinity of the outer edge of the ceramic mill blank.

REFERENCE SIGNS LIST

1: ceramic mill blank for dental cutting and machining
10: ceramic portion
11: outer peripheral surface
12: convex portion
12a: outer peripheral surface
20: seal member
S: slit

What is claimed is:

1. A ceramic mill blank for dental cutting and machining, wherein,
    the ceramic mill blank for dental cutting and machining comprises a ceramic portion to be cut and machined and one or more seal members,
    the ceramic portion consists of a ceramic material which is not finally sintered,
    the ceramic portion has an outer peripheral surface which is engageable with a holding tool,
    the one or more seal members are provided on the outer peripheral surface of the ceramic portion,
    a length of the one or more seal members is 50% or more of a length in a circumferential direction of the outer peripheral surface provided with the one or more seal members,
    the one or more seal members are provided with an adhesive material on at least one side, and
    the one or more seal members have a seal strength within a range of 1 to 50 N/9 mm when the one or more seal members having a width of 9 mm are peeled off from the outer peripheral surface of the ceramic portion at a speed of 1 cm/sec.

2. The ceramic mill blank for dental cutting and machining according to claim 1, wherein
    the ceramic portion includes a convex portion which is engageable with a holding tool on the outer peripheral surface, and
    the one or more seal members are provided on the outer peripheral surface of the convex portion.

3. The ceramic mill blank for dental cutting and machining according to claim 2, wherein
    a width of the one or more seal members is 50% or more of a dimension of the outer peripheral surface of the convex portion in a thickness direction of the ceramic portion.

4. The ceramic mill blank for dental cutting and machining according to claim 1, wherein
    a total length of the one or more seal members is 75% or more of a length in the circumferential direction of the outer peripheral surface provided with the one or more seal members.

5. The ceramic mill blank for dental cutting and machining according to claim 1, wherein
    a total length of the one or more seal members is 100% or more of a length in the circumferential direction of the outer peripheral surface provided with the one or more seal members.

6. The ceramic mill blank for dental cutting and machining according to claim 1, wherein
    a total length of the one or more seal members is within a range of 96% to 104% of a length in the circumferential direction of the outer peripheral surface provided with the one or more seal members.

7. The ceramic mill blank for dental cutting and machining according to claim 1, wherein
    the one or more seal members are formed with one or more slits.

8. The ceramic mill blank for dental cutting and machining according to claim 7, wherein
    the one or more slits are formed to be inclined with respect to a thickness direction of the outer peripheral surface of the convex portion.

9. The ceramic mill blank for dental cutting and machining according to claim 1, wherein
    the one or more seal members are colored in a color after final sintering of the ceramic portion.

10. The ceramic mill blank for dental cutting and machining according to claim 9, wherein
    the one or more seal members are printed with character information.

11. The ceramic mill blank for dental cutting and machining according to claim 10, wherein
    the one or more seal members is subjected to a treatment for separating an area where character information is printed and an area where character information is not printed.

12. The ceramic mill blank for dental cutting and machining according to claim 2, wherein
    a dimension of the convex portion of the ceramic portion in a thickness direction of the ceramic portion is within a range of 5 to 30 mm.

13. The ceramic mill blank for dental cutting and machining according to claim 1, wherein
    the ceramic mill blank for dental cutting and machining comprises two or more seal members.

14. The ceramic mill blank for dental cutting and machining according to claim 13, wherein
    the two or more seal members have different lengths relative to each other.

15. The ceramic mill blank for dental cutting and machining according to claim 1, wherein
    the one or more seal members are detachable from the ceramic portion.

16. The ceramic mill blank for dental cutting and machining according to claim 1, wherein
    the ceramic portion has a Vickers hardness within a range of 30 to 80 Hv0.2 as measured according to JIS Z 2244:2009.

17. The ceramic mill blank for dental cutting and machining according to claim 1, wherein
   a ratio of diameter to thickness in the ceramic portion is within a range of 10:1 to 2:1.

18. A set of ceramic mill blank for dental cutting and machining comprising two or more of the ceramic mill blanks for dental cutting and machining according to claim 9.

19. The ceramic mill blank for dental cutting and machining according to claim 1, wherein
   the one or more seal members are subjected to an embrittlement treatment.

* * * * *